(12) United States Patent
Randall et al.

(10) Patent No.: US 11,934,307 B2
(45) Date of Patent: Mar. 19, 2024

(54) APPARATUS AND METHOD FOR PROVIDING COHERENCE DATA FOR USE WHEN IMPLEMENTING A CACHE COHERENCY PROTOCOL

(71) Applicant: Arm Limited, Cambridge (GB)

(72) Inventors: Joshua Randall, Austin, TX (US); Jesse Garrett Beu, Austin, TX (US)

(73) Assignee: Arm Limited, Cambridge (GB)

( * ) Notice: Subject to any disclaimer, the term of this patent is extended or adjusted under 35 U.S.C. 154(b) by 13 days.

(21) Appl. No.: 17/905,566

(22) PCT Filed: Jan. 18, 2021

(86) PCT No.: PCT/GB2021/050103
§ 371 (c)(1),
(2) Date: Sep. 2, 2022

(87) PCT Pub. No.: WO2021/181057
PCT Pub. Date: Sep. 16, 2021

(65) Prior Publication Data
US 2023/0139212 A1 May 4, 2023

(30) Foreign Application Priority Data
Mar. 9, 2020 (GB) .................................. 2003386.6

(51) Int. Cl.
G06F 12/00 (2006.01)
G06F 12/02 (2006.01)
G06F 12/0831 (2016.01)
G06F 12/0871 (2016.01)

(52) U.S. Cl.
CPC ...... *G06F 12/0292* (2013.01); *G06F 12/0831* (2013.01); *G06F 12/0871* (2013.01)

(58) Field of Classification Search
CPC ............ G06F 12/0292; G06F 12/0831; G06F 12/0871; G06F 12/0802
See application file for complete search history.

(56) References Cited

U.S. PATENT DOCUMENTS 6,360,301 B1    3/2002  Gaither et al.
6,857,048 B2 *  2/2005  Rankin ............... G06F 12/0831
                                                    711/119
2003/0135696 A1 7/2003  Rankin et al.
(Continued)

*Primary Examiner* — Shawn X Gu
(74) *Attorney, Agent, or Firm* — NIXON & VANDERHYE P.C.

(57) ABSTRACT

An apparatus and method are provided for receiving a request from a plurality of processing units, where multiple of those processing units have associated cache storage. A snoop unit is used to implement a cache coherency protocol when a request is received that identifies a cacheable memory address. The snoop unit has snoop filter storage comprising a plurality of snoop filter tables organized in a hierarchical arrangement. The snoop filter tables comprise a primary snoop filter table at a highest level in the hierarchy, and each snoop filter table at a lower level in the hierarchy forms a backup snoop filter table for an adjacent snoop filter table at a higher level in the hierarchy. Each snoop filter table is arranged as a multi-way set associative storage structure, and each backup snoop filter table has a different number of sets than are provided in the adjacent snoop filter table.

26 Claims, 18 Drawing Sheets

(56) References Cited

U.S. PATENT DOCUMENTS

2006/0224839 A1* 10/2006 Blumrich ............ G06F 12/0831
                                                        711/146
2016/0188471 A1    6/2016 Forrest et al.

* cited by examiner

APPARATUS AND METHOD FOR PROVIDING COHERENCE DATA FOR USE WHEN IMPLEMENTING A CACHE COHERENCY PROTOCOL

BACKGROUND

The present technique relates to an apparatus and method for providing coherence data for use when implementing a cache coherency protocol.

In a data processing system, data may be stored in memory, and accessed by issuing access requests identifying the address within memory of the data to be accessed. In order to improve access times, it is known to provide a cache hierarchy comprising multiple levels of cache, within which a subset of the data held in memory can be temporarily stored for quicker access by the processing units within the system.

A system may often have multiple processing units, and local caches can be provided in association with at least some of those processing units. This can give rise to an issue of coherency in respect of the data, in that it is important to ensure that each of the processing units accesses the most up to date version of the data.

In order to handle the issue of data coherency, a snoop unit may be provided to implement a cache coherency protocol so as to ensure that in response to a request specifying a cacheable address, the most up to date data is accessed. The snoop unit may have snoop filter storage used to store coherence data in association with various addresses, which can be used to work out, for a particular specified address, which of the local cache storages provided in association with the various processing units may need to be subjected to a snoop operation when implementing the cache coherency protocol.

The snoop filter storage will have a finite number of entries for storing coherence data, and when allocating new coherence data into the snoop filter storage (i.e. coherence data for an address that is not currently being tracked within the snoop filter storage), then if all of the available entries to receive that new coherence data are currently storing valid coherence data for other addresses, it may be necessary to evict one of the existing entries. However, such an eviction can have a significant impact on performance, since it is necessary to perform back-invalidation operations in all of the local caches that currently store data for the address whose coherence data is going to be evicted from the snoop filter storage (as the local caches cannot store data that is not being tracked by the snoop filter storage). It is hence highly desirable to reduce the need to evict entries in the snoop filter storage. However, for cost and performance reasons it is also desirable to constrain the overall size of the snoop filter storage.

SUMMARY

In one example configuration, there is provided an apparatus to receive requests from a plurality of processing units, where multiple of the plurality of processing units have associated cache storage, the apparatus comprising: a snoop unit to implement a cache coherency protocol when a request received by the apparatus identifies a cacheable address within memory; the snoop unit having snoop filter storage comprising a plurality of snoop filter tables organised in a hierarchical arrangement, wherein the plurality of snoop filter tables comprise a primary snoop filter table at a highest level in the hierarchy, and each snoop filter table at a level in the hierarchy other than the highest level forms a backup snoop filter table for an adjacent snoop filter table at a higher level in the hierarchy; wherein: each snoop filter table is arranged as a multi-way set associative storage structure to provide a plurality of entries, and each backup snoop filter table has a different number of sets than are provided in the adjacent snoop filter table at the higher level in the hierarchy; each entry in the snoop filter tables is used to store, for an associated address, coherence data used to determine which cache storages provided within the multiple processing units need to be subjected to a snoop operation in response to a request specifying that associated address; and the snoop unit further comprises snoop control circuitry to control allocation of coherence data into entries of the snoop filter tables, wherein the snoop control circuitry is arranged, when new coherence data is to be allocated into the snoop filter storage, to apply an allocation policy to determine into which of the plurality of snoop filter tables the new coherence data is allocated.

In another example configuration, there is provided a method of providing coherence data within an apparatus that implements a cache coherency protocol, comprising: receiving at the apparatus requests from a plurality of processing units, where multiple of the plurality of processing units have associated cache storage; employing a snoop unit to implement the cache coherency protocol when a request received by the apparatus identifies a cacheable address within memory; providing a plurality of snoop filter tables organised in a hierarchical arrangement to form snoop filter storage, wherein the plurality of snoop filter tables comprise a primary snoop filter table at a highest level in the hierarchy, and each snoop filter table at a level in the hierarchy other than the highest level forms a backup snoop filter table for an adjacent snoop filter table at a higher level in the hierarchy; arranging each snoop filter table as a multi-way set associative storage structure to provide a plurality of entries, and providing each backup snoop filter table with a different number of sets than are provided in the adjacent snoop filter table at the higher level in the hierarchy; employing each entry in the snoop filter tables to store, for an associated address, the coherence data used to determine which cache storages provided within the multiple processing units need to be subjected to a snoop operation in response to a request specifying that associated address; and controlling allocation of coherence data into entries of the snoop filter tables by, when new coherence data is to be allocated into the snoop filter storage, applying an allocation policy to determine into which of the plurality of snoop filter tables the new coherence data is allocated.

In a still further example configuration, there is provided an apparatus to receive requests from a plurality of processing units, where multiple of the plurality of processing units have associated cache storage, the apparatus comprising: snoop unit means for implementing a cache coherency protocol when a request received by the apparatus identifies a cacheable address within memory; the snoop unit means having snoop filter storage means comprising a plurality of snoop filter table means organised in a hierarchical arrangement, wherein the plurality of snoop filter table means comprise a primary snoop filter table means at a highest level in the hierarchy, and each snoop filter table means at a level in the hierarchy other than the highest level forms a backup snoop filter table means for an adjacent snoop filter table means at a higher level in the hierarchy; wherein: each snoop filter table means is arranged as a multi-way set associative storage structure to provide a plurality of entries, and each backup snoop filter table means has a different number of sets than are provided in the adjacent snoop filter table means at the higher level in the hierarchy; each entry in the plurality of snoop filter table means is used to store, for an associated address, coherence data used to determine which cache storages provided within the multiple processing units need to be subjected to a snoop operation in response to a request specifying that associated address; and the snoop unit means further comprises snoop control means for controlling allocation of coherence data into entries of the snoop filter table means, wherein the snoop control means is arranged, when new coherence data is to be allocated into the snoop filter storage means, to apply an allocation policy to determine into which of the plurality of snoop filter table means the new coherence data is allocated.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
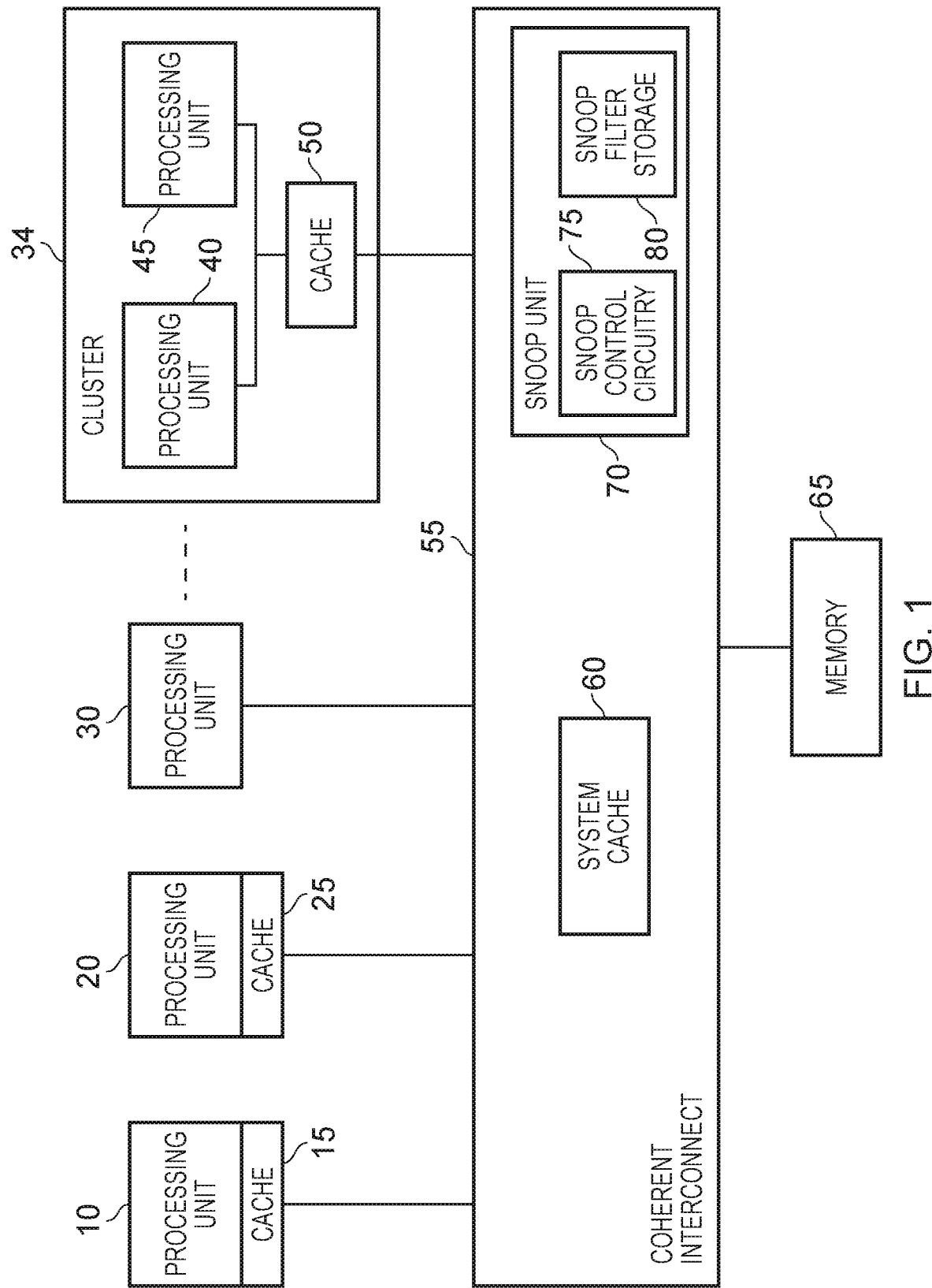
FIG. 1 is a block diagram of a system in accordance with one example arrangement.

In accordance with the techniques described herein, an apparatus is provided that is able to receive requests from a plurality of processing units, where multiple of those processing units (but not necessarily all of them) have associated cache storage. The apparatus provides a snoop unit for implementing a cache coherency protocol when a request received by the apparatus identifies a cacheable address within memory. The snoop unit has snoop filter storage for storing coherence data for a plurality of addresses. In accordance with the techniques described herein, the snoop filter storage is formed by a plurality of snoop filter tables that are organised in a hierarchical arrangement. In particular, the plurality of snoop filter tables comprise a primary snoop filter table at a highest level in the hierarchy, and then each snoop filter table at a level in the hierarchy other than the highest level forms a backup snoop filter table for an adjacent snoop filter table at a higher level in the hierarchy.

Each snoop filter table is arranged as a multi-way set associative storage structure to provide a plurality of entries. However, each backup snoop filter table has a different number of sets than are provided in the adjacent snoop filter table at the higher level in the hierarchy, and as a result the entries within any particular set in one snoop filter table can be shared amongst more than one set in the adjacent snoop filter table. In one example implementation the number of sets decreases as one proceeds from higher level snoop filter tables to lower snoop filter tables. However, in another implementation it may be the case that the number of sets increases as one proceeds from higher level snoop filter tables to lower snoop filter tables.

Each entry in the snoop filter tables is used to store, for an associated address, coherence data used to determine which cache storages provided within the multiple processing units need to be subjected to a snoop operation in response to a request specifying that associated address. The address associated with coherence data in an entry of the snoop filter storage can take a variety of forms, but in one example implementation is an address that specifies a particular cache line size block of data, and hence the coherence data in an entry can be used whenever a request specifies an address for data within the associated cache line size block.

In addition to providing the hierarchical arrangement of snoop filter tables to implement the snoop filter storage, the snoop unit also has snoop control circuitry for controlling allocation of coherence data into entries of the snoop filter tables. The snoop control circuitry is arranged, when new coherence data is to be allocated into the snoop filter storage, to apply an allocation policy to determine into which of the plurality of snoop filter tables the new coherence data is allocated.

In a traditional snoop filter storage providing only a single level of snoop filter table, if all of the entries in the identified set of that snoop filter table are full at the time the new coherence data is to be allocated, it would then be necessary to evict an entry from the snoop filter table, resulting in the requirement for back-invalidation of data from the relevant caches and the associated performance problems discussed earlier. However, due to the hierarchical arrangement of snoop filter tables described herein, the snoop control circuitry can instead, in such a scenario, make use of the flexibility provided by the backup snoop filter tables to seek to find an available entry in which to store the new coherence data.

The allocation policy applied by the snoop control circuitry can take a variety of forms. However, in one example implementation, the allocation policy applied by the snoop control circuitry causes coherence data to be preferentially allocated into the primary snoop filter table but for a backup snoop filter table to be utilised to provide an entry into which coherence data is allocated in the event that, when the new coherence data is to be allocated into the snoop filter storage, a set in the primary snoop filter table identified using the associated address of the new coherence data has no available entry. It should be noted that whilst in such a scenario, it may be the new coherence data that gets allocated to an entry in the backup snoop filter table, in an alternative implementation it may be the case that existing coherence data is moved to an entry in a backup snoop filter table to free up an entry in the primary snoop filter table to receive the new coherence data.

In one example implementation each backup snoop filter table has fewer sets than are provided in the adjacent snoop filter table at the higher level in the hierarchy, and as a result the entries within any particular set in a backup snoop filter table can be used as backup entries for more than one set in the adjacent higher level snoop filter table.

Since each backup snoop filter table has fewer sets than the adjacent snoop filter table at the higher level in the hierarchy, such an approach can potentially increase the number of entries into which the coherence data for any particular address can be allocated, but with significantly reduced storage requirements relative to a design that maintained a single snoop filter table and merely sought to provide an equivalent number of entries within each set of that single snoop filter table. Each backup snoop filter table can hence be viewed as providing additional ways that can be used as overflow for sets in the primary snoop filter table in situations where all of the entries within such a set in the primary snoop filter table currently store valid coherence data. Since each set in a backup snoop filter table is effectively shared by more than one set in the adjacent snoop filter table at the higher level in the hierarchy, this allows for some smoothing out of the variability in set distribution of the addresses of interest, allowing for the overall capacity of the snoop filter storage to be used more efficiently.

The number of sets provided in each backup snoop filter table, relative to the number of sets provided in the adjacent snoop filter table at the higher level in the hierarchy can be varied dependant on implementation, but in one example implementation the number of sets in each backup snoop filter table is $\frac{1}{2}N$ times the number of sets provided by the adjacent snoop filter table at the higher level in the hierarchy, wherein N is a positive integer. Whilst in one example implementation the positive integer N could be set to be the same value for each backup snoop filter table, so that for example the first backup snoop filter table below the primary snoop filter table may have half the number of sets as are provided by the primary snoop filter table, and a second backup snoop filter table below the first backup snoop filter table may have half the number of sets as are provided by the first backup snoop filter table, this is not a requirement, and in alternative embodiments the positive integer N can be set independently for each backup snoop filter table. This provides a great deal of flexibility as to how the entries within each backup snoop filter table are shared amongst sets in the adjacent higher level snoop filter table.

There are a number of options by which the snoop control circuitry can, for a specified address, identify which set in each snoop filter table that address maps to. In one example implementation, the snoop control circuitry is arranged, for each snoop filter table, to apply a set determination function using bits within a specified address to identify a set in that snoop filter table that the specified address is associated with. Further, the set determination function may be arranged such that the addresses that are associated with a given set in a given backup snoop filter table comprise addresses that are associated with at least two set in the adjacent snoop filter table at the higher level in the hierarchy.

There are a number of different manners in which such functionality can be achieved. In one example implementation, the set determination function is arranged such that all addresses that are associated with a set within a plurality of sets in the adjacent snoop filter table at the higher level in the hierarchy are associated with the given set in the given backup snoop filter table.

Such functionality can for example be achieved by selectively dropping one or more index bits of the index portion of the address when progressing from each snoop filter table to a lower snoop filter table, with the number of index bits dropped being dependent on the ratio of the number of sets provided in the higher level snoop filter table and the adjacent lower level snoop filter table. In one particular example implementation, the plurality of sets in the adjacent snoop filter table at the higher level in the hierarchy are adjacent sets. Such functionality can be achieved by dropping one or more of the least significant bits of the index portion of the address when progressing to the adjacent lower level snoop filter table.

However, there is no requirement that the plurality of sets need to be adjacent sets. For example, in an alternative implementation the set determination function may be arranged to use a first group of index bits when identifying the set in the adjacent snoop filter table at the higher level in the hierarchy that the specified address is associated with, and to use a subset of the first group of index bits when identifying the given set in the given backup snoop filter table that the specified address is associated with, where the subset of the first group of index bits omits at least one index bit other than a least significant index bit in the first group, such that the at plurality of sets in the adjacent snoop filter table at the higher level in the hierarchy are non-adjacent sets.

Whilst in the above examples the index bits are used when generating an index into each snoop filter table, in other example implementations bits other than the index bits of the address can be used, at least for snoop filter tables at some of the levels in the hierarchy. For example, for a lower level snoop filter table, one or more of the tag bits of the address could be used when generating the index into the lower level table. This would causes entries in a set in the higher level table to have multiple candidate sets in the lower level table, which could add another layer of flexibility in the design.

As a still further example of how the set determination function may be implemented, for at least one snoop filter table, the set determination function may apply a hash function to selected bits within the specified address to identify the set that the specified address is associated with. By using such a hash function, this will remove correlation between sets so that it will not typically be the case that the entries in a given set in a backup snoop filter table are used by adjacent sets in a higher level snoop filter table.

In one example implementation, the set determination function may be arranged to apply a hash function in respect of every snoop filter table. However, alternatively, if desired, the snoop control circuitry may be arranged to apply a hash function when generating an index into one or more snoop filter tables, whilst using a different operation (such as using bits of the address directly) to identify a set in one or more other snoop filter tables.

In another example implementation, different hash functions could be used in respect of different snoop filter tables. In particular, in such an implementation, the set determination function may be arranged, for at least one adjacent pair of snoop filter tables, to apply a first hash function when identifying a set in the first snoop filter table of the pair and a second hash function different to the first hash function when identifying a set in the second snoop filter table of the pair, whereby coherence data for a plurality of addresses that map to the same set in the first snoop filter table map to different sets in the second snoop filter table. In some example implementations, such an approach may increase the probability of finding an available entry for new coherence data, and thus avoid the requirement to perform an eviction, but could add latency to the design and reduce bandwidth when victim selection (to identify an entry to evict) requires multiple lookups.

In one example implementation, a technique may be applied to seek to keep as many entries as possible within the one or more backup snoop filter tables available for allocation to new coherence data. In one example implementation, for at least one of the snoop filter tables the snoop control circuitry is arranged, when the coherence data stored in an identified entry within a given set of that snoop filter table is no longer required, to apply an eager promotion policy to determine whether an entry in an adjacent lower level snoop filter table stores coherence data whose associated address is associated with the given set, and in that event to move the coherence data from that entry in the adjacent lower level snoop filter table to the identified entry within the given set. Hence, as entries become available in a higher level snoop filter table, then in accordance with the eager promotion policy the snoop control circuitry can seek to identify entries in a lower level snoop filter table that store coherence data that could be stored in that freed up entry in the higher level snoop filter table, and in that event can migrate coherence data from the lower level snoop filter table to the higher level snoop filter table. This can be beneficial since, as mentioned earlier, any particular set in a lower level snoop filter table may be shared amongst multiple sets in the higher level snoop filter table, and accordingly by keeping the sets in the lower level snoop filter table as free as possible, this increases the likelihood that a free entry can be found in a lower level snoop filter table in situations where the relevant set in the higher level snoop filter table does not have any available entries.

Such an eager promotion policy could be implemented in respect of every snoop filter table, or if desired may be performed in association with only a subset of those snoop filter tables.

As an alternative to applying an eager promotion policy, in an alternative implementation a lazy promotion policy could instead be employed in respect of all, or at least a subset of the snoop filter tables. In particular, in one example implementation, for at least one of the snoop filter tables the snoop control circuitry is arranged, when seeking to allocate new coherence data to an entry within a given set of that snoop filter table when all entries within that given set currently store valid coherence data, to apply a lazy promotion policy to identify whether, based on the addresses of the valid coherence data stored in the given set, there is an available recipient entry in an adjacent higher level snoop filter table to receive the valid coherence data from a source entry in the given set, and in that event to move the valid coherence data from the source entry in the given set to the available recipient entry in the adjacent higher level snoop filter table, and to then allocate the new coherence data to the source entry in the given set.

Hence, in accordance with the lazy promotion policy, if when considering allocating new coherence data into an entry of a given set of a given snoop filter table, it is determined that all of the entries in the given set are currently utilised, then rather than seeking to allocate the new coherence data into a lower level snoop filter table, the snoop control circuitry can instead seek to work out whether any of the current contents within the given set can be migrated to an entry in a higher level snoop filter table. In that event, the contents of one entry can be migrated to the higher level snoop filter table, freeing that entry up for allocation of the new coherence data.

Such a strategy may be of assistance in the average case, because it may be relatively rare for sets in lower level snoop filter tables to become full. However, when such a lower level snoop filter table does become full, adoption of such a lazy promotion policy does require a significant number of additional lookups in order to seek to locate possible free entries in the higher level snoop filter table.

Whilst in some implementations the snoop filter tables may be arranged to all use the eager promotion policy or all use the lazy promotion policy, if desired the eager promotion policy may be applied in respect of one or more snoop filter tables whilst the lazy promotion policy is used in respect of one or more other snoop filter tables. In some implementations involving three or more snoop filter tables, there may be some benefit in only applying the lazy promotion policy at the interface between one pair of the snoop filter tables, as when the lazy promotion policy is used at the interfaces between multiple different levels of snoop filter tables, this could have a significant impact on performance due to the proliferation in lookup operations required in order to seek to identify entries in one or more of the higher level snoop filter tables that coherence data in the lowest level can be migrated to.

In one example implementation, in response to a received request whose identified address is a cacheable address within memory, the snoop control circuitry can be arranged to perform a lookup operation in the snoop filter storage to determine whether an entry within the snoop filter storage stores coherence data for that identified address. In accordance with the techniques described herein the snoop control circuitry is arranged to adopt an access policy to determine how the individual snoop filter tables are accessed during the lookup operation. For example, in one particular implementation the access policy may cause each of the snoop filter tables to be accessed in parallel during the lookup operation. By adopting a parallel lookup approach, this may improve latency of individual requests.

However, in an alternative implementation, for at least one adjacent pair of snoop filter tables, the access policy may cause a higher level snoop filter table in the pair to be accessed before a lower level snoop filter table in the pair. By performing accesses sequentially, this can improve power consumption by reducing unnecessary lookups. It is also possible that such a sequential access approach may improve throughput in certain designs, for instance in situations where the snoop control circuitry is arranged in a pipelined manner to enable lookup operations to be performed simultaneously for the identified addresses of multiple received requests. Hence, purely by way of example, if a lookup performed in a higher level snoop filter table for a first access request misses, then in a next lookup cycle a lookup can be performed within the adjacent lower level snoop filter table in respect of the first access request, whilst a different lookup is performed in the higher level snoop filter table in respect of a second access request.

It is also observed that many accesses may not require a lookup in the final, lowest, level snoop filter table, which may mitigate the latency to memory when using a serial lookup approach.

When adopting the serial lookup approach, then in certain instances it will be possible to detect situations where one or more of the lower level snoop filter tables do not need to be accessed. For example, in situations where the snoop control circuitry is arranged to apply the earlier-discussed eager promotion policy in respect of the higher level snoop filter table in the pair, then when at least one entry in the set of the higher level snoop filter table associated with the identified address is an available entry for storing coherence data, the snoop control circuitry may be arranged to determine that no lookup is required in at least the lower level snoop filter table in the pair. In particular, in accordance with the eager promotion policy, if any of the relevant entries in the lower level snoop filter table had included valid coherence data that could be stored in the accessed set in the higher level snoop filter table, then that coherence data would have been migrated into the set in the higher level snoop filter table in order to fill up the entries within that set, and hence the presence of at least one free entry in the set of the higher level snoop filter table indicates that there is no relevant data in at least the lower level snoop filter table. If the eager promotion policy is used at all levels, such a situation may be used to identify that there is no relevant data in any lower level snoop filter table. However, if the lazy promotion policy is used in association with at least one lower level table then a lookup may still be required in that lower level table.

As another example of techniques that can be employed when using the serial lookup approach in order to detect situations where lookups in one or more of the lower level snoop filter tables are not required, then presence data may be maintained to assist in detecting such conditions. For example, the snoop filter storage may be arranged to maintain presence data to enable detection of a situation where the lower level snoop filter table does not store coherence data for the identified address, such that no lookup within the lower level snoop filter table is required.

The presence data can take a variety of forms. For example, in one implementation the presence data takes the form of a presence bit for each set in the higher level snoop filter table, whose value indicates whether coherence data for an address that is associated with that set is allocated in an entry of a lower level snoop filter table. Hence, in such an example implementation a bit per set can be provided in each table to signify if there is any coherence data in subsequent tables that would map to an entry in that set, thereby avoiding additional table accesses when the accessed set in the current table is full, but has not caused overflow of any entries into the lower level snoop filter tables.

Instead of using such a presence bit, the presence data can instead take a different form. For instance, in one example implementation the presence data takes the form of a vector of presence bits for each set in the lower level snoop filter table. Then, when coherence data for an address is allocated in an entry of a given set in the lower level snoop filter table, a chosen subset of bits of the address (for example some of the tag bits) are used to set at least one presence bit in the vector provided for the given set. The way in which the chosen subset of bits is used to identify each presence bit may vary dependent on implementation. For example the bits could be used directly or passed through a hashing function. Subsequently, a chosen subset of bits of an identified address may be used to identify at least one presence bit in the vector provided for the set in the lower level snoop filter table associated with the identified address, and the snoop control circuitry may be arranged to determine that an access to the lower level snoop filter table is not required if any of the at least one identified presence bits is clear. In particular, if any identified presence bit is clear, it is known that none of the entries in the lower level snoop filter table store coherence data for the identified address.

By filtering out superfluous accesses to lower level snoop filter tables, this will help to reduce the snoop filter latency, which would improve the critical path for a memory access. To seek to minimise this latency, the accesses to successive tables can be filtered out using a presence bit vector of the form described above. As a result, the use of such a presence bit vector can reduce latency and power consumption.

Due to the way in which the presence bits in the presence bit vector are set, the check against the presence bit vector for an address will not allow false negatives. In particular, if any identified presence bit is clear, it is known that the lower level snoop filter table does not include coherence data for the identified address. However, if each identified presence bit is set, a lookup will be performed. This does not necessarily mean that coherence data does exist in the lower level snoop filter table for the identified address, since multiple different addresses may map to the same presence bits. However, this does not cause any incorrect operation since it may merely mean that a lookup is performed in the lower level snoop filter table, and in fact it turns out that there is no coherence data stored therein for the identified address (i.e. the comparison of presence bits gave a false positive).

Whilst for any particular identified address, the chosen subset of bits of that address may be used to identify a single presence bit, this is not a requirement, and in an alternative implementation those subset of bits could be used to identify two or more presence bits in the presence bit vector, for instance using a different hashing function to identify each presence bit. For example, in one implementation the vector of presence bits is organised as a Bloom filter and, for each address, two or more presence bits are identified in the vector provided for the set in the lower level snoop filter table associated with that address. Such a Bloom filter would reduce false positives (i.e. situations where the identified presence bits are set, thereby causing a lookup to be performed when in fact the required coherence data is not present in the lower level snoop filter table). In particular, the reduction of false positives occurs by causing multiple presence bits to be accessed using the relevant address, and only if all of the identified presence bits are set is a lookup performed in the lower level snoop filter table.

When adopting an implementation that uses a presence bit vector in association with each of the sets in a lower level snoop filter table, then the current state of the presence bits in the presence bit vector can be used to influence decisions taken when a victim entry is to be selected. For example, when seeking to move or evict coherence data from one of the entries of a given set in the lower level snoop filter table, the snoop control circuitry may be arranged to preferentially select coherence data that will allow clearing of at least one presence bit in the associated vector. This will then further reduce the likelihood of false positives occurring when subsequently referencing the presence bit vector, and hence further reduce the likelihood of unnecessary lookups being performed.

Similarly, when seeking to migrate coherence data from a source entry within a set in the higher level snoop filter table to a recipient entry in a given set in the lower level snoop filter table, the snoop control circuitry may be arranged to preferentially select coherence data whose associated address is such that the selected coherence data can be allocated into the recipient entry without needing to set within the presence bit vector associated with the given set, any presence bits that are currently clear. This would hence allow additional coherence data to be added into the given set without any more bits in the presence bit vector being set, and hence without increasing the risk of false positives being detected for subsequent addresses, and thereby reducing the chance of unnecessary lookups being performed.

The number of ways provided in each snoop filter table is a matter of design choice. However, in one example implementation at least one snoop filter table is arranged to have more ways than are provided in an adjacent snoop filter table at a higher level in the hierarchy. By increasing the number of way in such a manner, this increases the number of entries that can be shared amongst the associated multiple sets in the higher level snoop filter table, and hence can assist in reducing the prospect of an eviction from the snoop filter storage being required.

Higher level snoop filter tables may have more utilization (occupancy) because they may be preferred for allocation. Set imbalance may be greater in the lower level snoop filter tables, and by increasing the associativity in those lower level tables this can serve to alleviate the set contention caused by that imbalance. It is also noted that additional ways in the lower level snoop filter tables require less overall storage than additional ways in the higher level tables, in implementations where there are fewer sets in the lower level snoop filter tables.

Particular examples will now be described with reference to the Figures.

FIG. 1 is a block diagram of a system in accordance with one example implementation. A plurality of processing units 10, 20, 30, 40, 45 are coupled to a coherent interconnect 55 via which they can access a plurality of slave devices (not explicitly shown in the figure), where one of those slave devices may be a memory controller for controlling access to memory 65. Each of the processing units 10, 20, 40, 45 has associated cache 15, 25, 50 for storing cached versions of data from the memory 65. However it is not essential for each processing unit to have an associated local cache structure, and one or more of the processing units may not have a local cache structure (such as processing unit 30 shown in FIG. 1). In addition to the local cache structures, one or more shared cache structures may also be provided, such as the system cache 60.

Whilst the various processing units connected to the interconnect 55 may be individual processing units, such as a central processing unit (CPU) or a graphics processing unit (GPU), it is possible that one or more of the processing units may effectively form a subsystem/cluster, consisting of multiple individual processing units which may for example have access to a shared cache structure, as illustrated by way of example with reference to the subsystem 34 comprising the processing units 40, 45 that share a local cache structure 50. In one specific example the subsystem takes the form of a multi-threaded processor core, and the individual processing units 40, 45 therein are separate threads.

Whenever the system includes processing units that have an associated local cache structure, it will typically be necessary for the interconnect to implement a cache coherency protocol to ensure that the various processing units coupled to the interconnect will always see the most up-to-date version of any particular data item. To assist in implementing the cache coherency protocol, the coherent interconnect 55 includes a snoop unit 70 which aims to keep track, for each of a number of different memory portions, of which processing units have accessed addresses within those memory portions, thus identifying which processing units may hold cached copies of data relating to those memory portions. When it is determined that a coherency action is required, the snoop unit 70 is used to determine which caches associated with the processing units should be subjected to a snoop operation in order to determine information about the data cached within those caches for a particular memory address.

In particular, a snoop request can be issued from the snoop unit to such a cache specifying a snoop address, causing a lookup to be performed within the cache, and information returned to the snoop unit indicative of the result of that lookup. There will typically be local coherency control circuitry in association with each of the caches that can take an appropriate action in response to the snoop request. In particular, if a hit is detected, then dependent on the cache coherency protocol being used and the type of snoop request, it may be appropriate for the local cache to invalidate the cache line containing a copy of the data and to return its copy of the data to the snoop unit as part of a snoop response. Alternatively, it may return the data to the snoop unit without invalidating its copy. Further, in other examples, it may merely need to invalidate the cache line containing a copy of the data, without needing to return its copy of the data to the snoop unit.

When an access request is issued by one of the processing units seeking to access data at a memory address specified by the access request, and a hit is not detected in any local cache structure of that processing unit, then that access request may be propagated on to the snoop unit 70. It should be noted that that access request may still be propagated on to the snoop unit even if there is a hit in a local cache, depending on the type of access that the processing unit is seeking to perform. For example, if the originating processing unit (i.e. the processing unit issuing the access request) is seeking to perform a write access, and a hit is detected in its local cache, it may be appropriate to determine whether any of the other processing units also have a local cached copy, by reference to the snoop unit 70, since those copies will become out of data once the write access has been performed to the originating processing unit's local cache, and hence it may be considered appropriate to invalidate any other processing unit's local copies at the time the write access is being performed to the originating processing unit's local cache.

Whenever an access request is received by the snoop unit 70, then snoop control circuitry 75 within the snoop unit 70 is used to determine whether any snoop operations are required, and if so to issue snoop requests to the relevant processing units to cause snoop operations to be performed, during which their local cache structures will be accessed as discussed earlier and any appropriate coherency action taken, resulting in the provision of a snoop response back to the snoop unit.

Rather than merely broadcasting a snoop request to every processing unit that has an associated local cache structure, the snoop unit 70 has snoop filter storage 80 that provides a plurality of entries, where each entry is arranged to identify a memory portion, and to maintain coherence data indicative of the processing units that have accessed that memory portion. The memory portion identified in each snoop filter entry can take a variety of forms. In one example implementation, each memory portion corresponds to a cache line size block of data, and is identified by an associated address for that block of data.

When an access request is received at the snoop unit 70, the snoop control circuitry 75 can perform a lookup operation within the snoop filter storage 80 using the memory address specified by the access request in order to determine whether there is a hit in any of the snoop filter entries, i.e. whether the memory address is an address within the memory portion associated with a particular snoop filter entry. If so, then the coherence data can be retrieved from that snoop filter entry in order to determine which of the processing units are to be subjected to a snoop operation. The various entries in the snoop filter storage are updated as each access request is performed by the processing units, so as to seek to maintain information about the processing units that have accessed particular memory portions being tracked within the snoop filter storage. By such an approach, this can significantly reduce the number of snoop operations that need to be performed, relative to an approach which merely speculatively broadcasts snoop requests to all of the processing units.

In modern systems there may be a significant number of processing units with associated local cache structures, and the sizes of the local caches are becoming larger. These factors can put pressure on the size of the snoop filter storage 80 provided to keep track of coherence data for the cached data. It is desirable to size the snoop filter storage so as to reduce situations where coherence data needs to be evicted from an entry in the snoop filter storage to make way for the allocation of new coherence data. In particular, if existing coherence data for a memory address needs to be evicted, then any cached data for that memory address in the local cache structures 15, 25, 50 will typically need to be back-invalidated, by invalidating those cache lines in the local caches, and storing any dirty and valid data back to a lower level cache such as the system cache 60. This is because the snoop filter storage needs to keep track of all data cached in the local cache structures 15, 25, 50, and hence it is not sufficient merely to overwrite existing valid coherence data with coherence data for a different address.

The requirement to perform such back-invalidation of potentially multiple cache lines can significantly impact performance, and accordingly as the cache sizes increase, and/or the number of processing units in the system increase, this can give rise to a desire to increase the number of entries in the snoop filter storage. However, it is desirable to constrain the overall size of the snoop filter storage, since as the snoop filter storage increases in size, then so the cost and power consumption of the system will increase. The techniques described herein provide an arrangement for the snoop filter storage that can, for a given number of entries, reduce the likelihood of an eviction being required when compared with a standard snoop filter storage design having that given number of entries.

Figure 2:
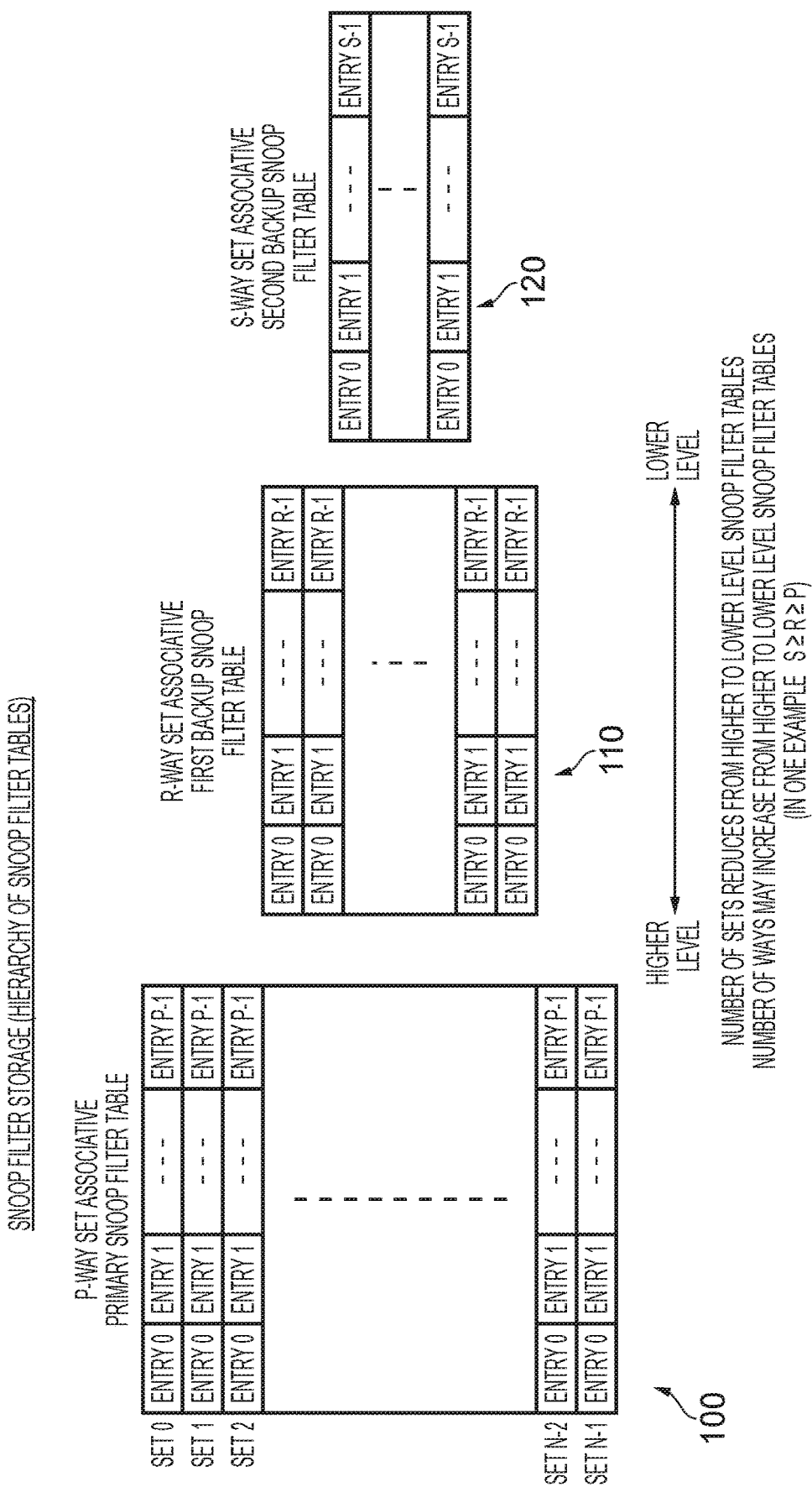
FIG. 2 schematically illustrates a hierarchical arrangement of snoop filter tables that may be used to implement the snoop filter storage in one example implementation.

In particular, as illustrated in FIG. 2, in accordance with the techniques described herein the snoop filter storage 80 is arranged to consist of a plurality of snoop filter tables organised in a hierarchical arrangement. In one example system, two snoop filter tables may be provided, but the technique is generally applicable to designs having two or more snoop filter tables within the hierarchical arrangement, and in the example of FIG. 2 three snoop filter tables 100, 110, 120 are provided. The snoop filter tables include a primary snoop filter table 100 at a highest level in the hierarchy, and then one or more backup snoop filter tables 110, 120 at lower levels in the hierarchy.

Each snoop filter table is arranged as a multi-way set associative storage structure providing a plurality of entries. Further, each backup snoop filter table has a different number of sets to the number of sets provided in the adjacent higher level snoop filter table. In the example implementation illustrated in FIG. 2, each backup snoop filter table has fewer sets than the adjacent snoop filter table at the higher level in the hierarchy. Hence, in the example shown in FIG. 2, whilst the primary snoop filter table 100 has N sets, the first backup snoop filter table 110 has less than N sets, and the second backup snoop filter table 120 has less sets than are provided in the first backup snoop filter table 110. In one particular example implementation, each backup snoop filter table has half the number of sets as are provided in the adjacent higher level snoop filter table. However, if desired, the deeper levels of snoop filter tables can be provisioned more aggressively by providing for example ¼ or ⅛ the number of sets as are provided at the previous level.

When the snoop control circuitry 75 decides that there is new coherence data to be allocated into the snoop filter storage, i.e. there is data being allocated into one or more of the local caches 15, 25, 50 whose associated address is not yet tracked by an entry in the snoop filter storage 80, then the snoop control circuitry will apply an allocation policy to decide into which snoop filter table the new coherence data is allocated. Whilst a variety of different allocation schemes could be used, in one example implementation the snoop control circuitry will preferentially allocate the new coherence data into the primary snoop filter table, assuming there is an available entry.

In one example implementation the snoop control circuitry 75 will use chosen bits of the address associated with the new coherence data to identify a particular set within the primary snoop filter table 100. If all of the entries in that identified set currently store valid coherence data for other addresses, then rather than seeking to evict one of those existing entries, the snoop control circuitry may instead perform a lookup in the first backup snoop filter table to see if there is an available entry. In particular, using chosen bits of the address (which may include at least some bits that are different to the bits used for the lookup in the primary snoop filter table), the snoop control circuitry may identify a particular set in the first backup snoop filter table, and see if there are any available entries. If so, then the new coherence data may be allocated into one of the available entries in the first backup snoop filter table. Similarly, if all of the entries in the identified set of the first backup snoop filter table are full, then in implementations where there is at least one further additional backup snoop filter table, then a lookup can be performed within an identified set in the lower backup snoop filter table to see if there is an available entry.

As an alternative to the above approach, when the identified set in the primary snoop filter table is full, the snoop control circuitry can seek to migrate existing coherence data in an entry of the identified set to a lower level snoop filter table, so as to then free up an entry in the primary snoop filter table to receive the new coherence data.

In implementations where the number of sets provided in each backup snoop filter table is less than the number of sets provided in the adjacent higher level snoop filter table, this means that any particular set in a backup snoop filter table will be shared by more than one set in the adjacent higher level snoop filter table. In particular, addresses that might map to different sets in the adjacent higher level snoop filter table may in fact map to a single set in the adjacent lower level backup snoop filter table. As such, it can be seen in such an implementation that each of the sets in a backup snoop filter table are shared by multiple sets in the adjacent higher level snoop filter table, and the backup snoop filter table effectively provides additional spare entries that can be utilised. Effectively, each backup snoop filter table provides additional ways for the sets in the primary snoop filter table, but without needing to extend the number of ways for every set in the primary snoop filter table, since the entries in the backup snoop filter tables are shared amongst multiple sets. This allows for significantly improved efficiency in the use of available space within the snoop filter storage. Indeed, it has been found that a design of snoop filter storage such as that shown in FIG. 2 may have significantly fewer total entries (i.e. the total number of entries in the primary snoop filter table and each of the backup snoop filter tables) than would need to be provided in a baseline standard snoop filter consisting of a single snoop filter table, whilst performing significantly better than that baseline design, by reducing the occurrences of evictions being required from the snoop filter storage.

Whilst as illustrated in FIG. 2 the number of sets in a backup snoop filter table may be reduced relative to the number of sets in the adjacent higher level snoop filter table, the factor in the reduction does not need to be the same between each pair of filter tables. Hence, purely by way of example, whilst the first backup snoop filter table 110 may have half the number of sets provided in the primary snoop filter table 100, the second backup snoop filter table 120 could have a quarter of the number of sets provided in the first backup snoop filter table 110 if desired.

Also, not all of the snoop filter tables need to have the same number of ways. For example, the number of ways provided in a backup snoop filter table may be more than the number of ways provided in the adjacent higher level snoop filter table if desired. In the example shown in FIG. 2, there are P ways in the primary snoop filter table 100, R ways in the first backup snoop filter table 110, and S ways in the second backup snoop filter table 120. Hence, for any particular address, a single set in each of the snoop filter tables may be identified, resulting in there being P possible entries in the primary snoop filter table, R possible entries in the first backup snoop filter table, and S possible entries in the second backup snoop filter table. In accordance with the designs considered herein, the value S may be greater than or equal to the value R, which in turn may be greater than or equal to the value P.

By providing more ways in the lower level snoop filter tables, this increases the number of entries that can be shared amongst multiple sets in the adjacent higher level snoop filter table. Whilst the provision of more ways may increase access latency or tag matching time, this can often be tolerated better in the lower level tables, as many of the accesses may be serviced by hits occurring in a higher level table.

Further, as mentioned earlier, higher level snoop filter tables may have more utilization (occupancy) because they may be preferred for allocation. Set imbalance may be greater in the lower level snoop filter tables, and by increasing the associativity in those lower level tables this can serve to alleviate the set contention caused by that imbalance. It is also noted that additional ways in the lower level snoop filter tables require less overall storage than additional ways in the higher level tables, in implementations where there are fewer sets in the lower level snoop filter tables.

As an alternative to reducing the number of sets as one progresses from higher level tables to lower level tables, one could instead increase the number of sets, and still obtain flexibility benefits. Consider for example a primary snoop filter table, and a backup snoop filter table with more sets than the primary snoop filter table. Assume for simplicity that addresses that map into set 0 in the primary snoop filter table may map into sets 0 or 1 in the backup snoop filter table. If a situation arises where, for example, set 0 in the backup snoop filter table is full, a lookup can be performed in set 0 of the primary snoop filter table to see if there is an entry whose coherence data can be migrated to set 1 in the backup snoop filter table. If so then that coherence data can be migrated to set 1 of the backup snoop filter table, freeing up an entry in set 0 of the primary snoop filter table. If desired, coherence data in an entry of set 0 of the backup snoop filter table can then be migrated to the free entry in set 0 of the primary snoop filter table.

Figure 3:
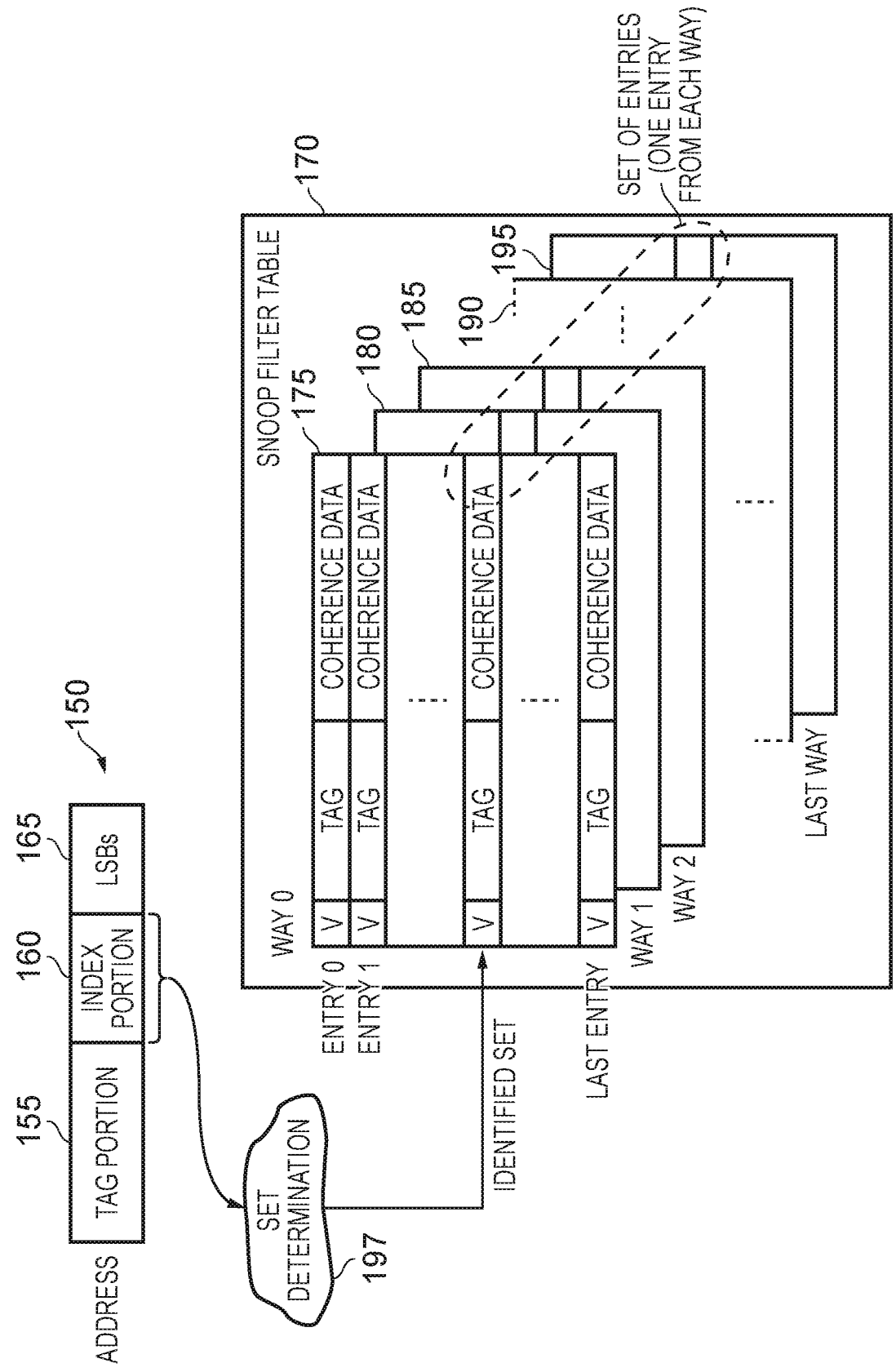
FIG. 3 is a diagram schematically illustrating the set associative arrangement of entries within a snoop filter table in accordance with one example arrangement.

FIG. 3 illustrates the set associative nature of each snoop filter table. In this example the snoop filter table 170 includes multiple ways 175, 180, 185, 190, 195. Each way provides multiple entries, and the corresponding entries in each way collectively form a set of entries.

Figure 4:
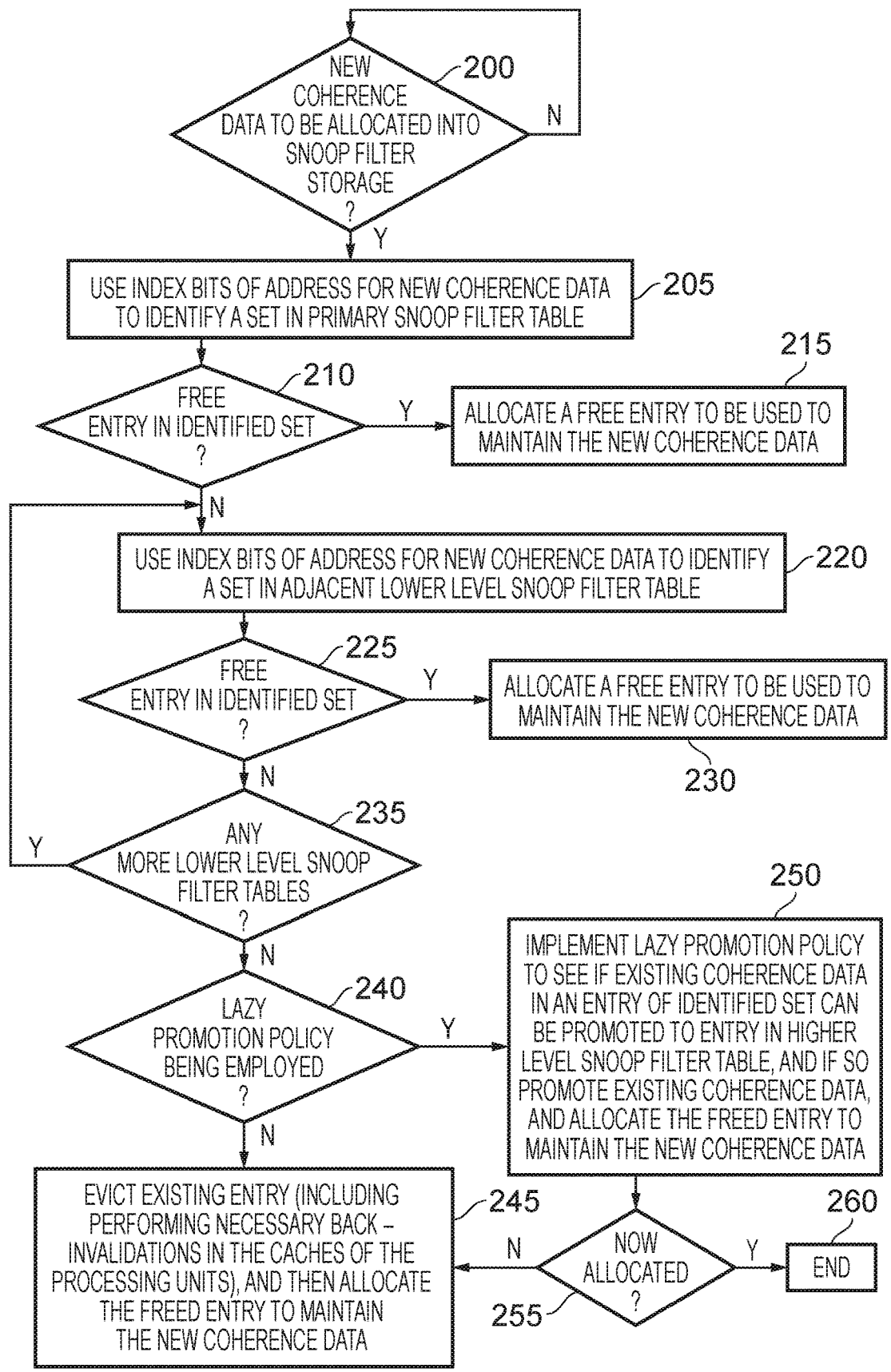
FIG. 4 is a flow diagram illustrating the steps performed by the snoop control circuitry of FIG. 1 in order to allocate new coherence data into the snoop filter storage, in accordance with one example arrangement.

When an address 150 is received, a number of the least significant bits 165 may identify individual data values (such as individual words) within a memory region such as a cache line size memory region. Given than the individual entries in a snoop filter table store coherence data for a memory block such a cache line size block of data, then those least significant bits 165 can be ignored, and the relevant address for the purposes of a lookup in the snoop filter table is formed by the more significant bits of the address, these consisting of a tag portion 155 and an index portion 160. In one example implementation, the index portion 160 of the address may be provided to a set determination function 197 which determines from that index portion an index value used to identify a particular set within the snoop filter table. Each of the entries within that set has a tag field to store a tag value, which can then be compared with the tag portion 155 of the address to determine whether there is a hit, i.e. whether the addresses match. In the event of a matching entry being found, then the coherence data maintained within that entry can be used to identify which caches need to be subjected to a snoop operation. The coherence data can take a variety of forms, but could for example comprise a single bit per local cache, which is set when it is determined that that local cache may store a cached copy of the data, and which is clear when it is known that that local cache does not store a cached copy of the data. As will be apparent from the earlier discussion of FIG. 2, given that the number of sets is different in each of the snoop filter tables, then the set determination function 197 will operate slightly differently when generating indexes for the different levels of backup snoop filter table. This will be discussed in more detail later with reference to the examples of FIGS. 6A to 6D. In addition, in some implementations, for at least a subset of the snoop filter tables, bits other than the index bits can be provided to the set determination function 197, for use in generating the index into a snoop filter table FIG. 4 is a flow diagram illustrating steps performed by the snoop control circuitry 75 when allocating new coherence data to the snoop filter storage 80, in one example implementation. At step 200, it is detected if there is new coherence data to be allocated into the snoop filter storage. As discussed earlier, this will for example occur when one or more of the local caches is used to cache data having a memory address that is not currently tracked by one of the entries in the snoop filter storage.

Once it is determined that there is new coherence data to be allocated into the snoop filter storage, then at step 205 the index bits of the address for the new coherence data (or other bits depending on implementation) may be used to identify a set in the primary snoop filter table. Thereafter, at step 210, it is determined if there is a free entry in the identified set. This can be determined in a variety of ways, but in one example each of the entries includes a valid bit which is set to indicate that the corresponding entry stores valid coherence data, and which is clear to indicate that the entry no longer stores valid coherence data, and accordingly is free for allocation.

If a free entry is found in the identified set, then at step 215 that free entry is allocated to be used to maintain the new coherence data. At this point, the tag field of the entry will be used to identify the tag value provided in the tag portion 155 of the address 150, and the coherence data will be initialised to identify the cache or caches into which the data has been stored. The valid bit will also be set to identify that the entry stores valid coherence data.

If no free entry is found at step 210, then the index bits of the address (or other bits depending on implementation) may be used to identify a set in an adjacent lower level snoop filter table at step 220. It is then determined if there is a free entry in that identified set at step 225, and if so then at step 230 that free entry is allocated to be used to maintain the new coherence data. The same process is performed here as discussed earlier with reference to step 215.

If no free entry is identified at step 225, then at step 235 it is determined if there are any more lower level snoop filter tables, and if so the process returns to step 220.

If it is determined at step 235 that there are no more lower level snoop filter tables, then at this stage this means that the relevant set in each of the snoop filter tables is full, and accordingly it may be necessary to evict an existing entry. However, as shown by step 240, in one example implementation it is first determined whether a lazy promotion policy is being employed in respect of the interface between the final level snoop filter table and the adjacent higher level snoop filter table. This process will be discussed in more detail with reference to FIG. 8, but in summary, as indicated by step 250, if the lazy promotion policy is being employed, then that lazy promotion policy is implemented to see if existing coherence data in an entry of the identified set can be promoted to an entry in a higher level snoop filter table. If so, then the existing coherence data is promoted, and then the new coherence data is allocated into the freed entry. At step 255, it is determined if the new coherence data has now been allocated, and if so the process ends at step 260.

However, if the lazy promotion policy has not resulted in an entry being freed into which the new coherence data can be allocated, or if the lazy promotion policy is not being employed, the process proceeds to step 245 where an existing entry is evicted. As discussed earlier, this will involve performing back invalidation operations in respect of the relevant caches associated with the processing units to ensure that those caches no longer cache data associated with the address of the entry whose coherence data is being evicted from the snoop filter storage. Thereafter, the new coherence data can be allocated into the freed entry.

Figure 5:
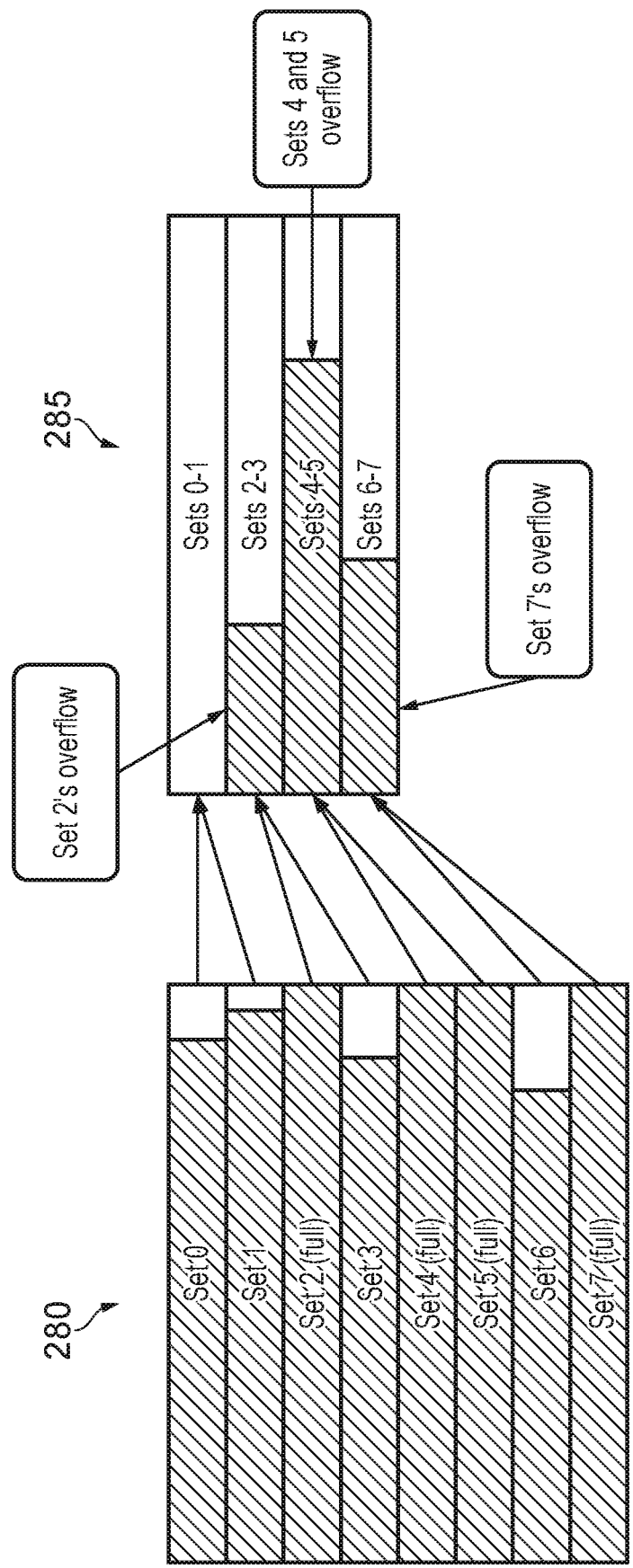
FIG. 5 schematically illustrates how sets within a backup snoop filter table may be shared by multiple sets in a higher level snoop filter table in the hierarchy, in accordance with one example implementation.

FIG. 5 schematically illustrates how the entries in a backup snoop filter table 285 can be used to provide overflow entries for an adjacent higher level snoop filter table 280. In this example, the manner in which the address bits are used to identify sets in each snoop filter table are such that two adjacent sets in the higher level snoop filter table 280 share the same set in the adjacent lower level snoop filter table 285. Hence, in this simple example there are eight sets in the higher level snoop filter table 280, and four sets in the lower level snoop filter table 285, with each of those four sets being used to provide overflow entries for two of the sets in the higher level snoop filter table. As shown, sets 2, 4, 5 and 7 in the higher level snoop filter table 280 are full, and accordingly when additional coherence data needs to be stored for addresses that map to those sets, then that additional coherence data may be allocated into entries within the lower level snoop filter table 285. Hence, the second set in the lower level snoop filter table 285 is able to store additional items of coherence data that would otherwise have to have been allocated within set 2 of the higher level snoop filter table 280. Similarly, the third set is used to store coherence data that would otherwise have to have been stored in either set 4 or set 5 of the higher level snoop filter table 280, whilst the fourth set acts to provide overflow entries for set 7 of the higher level snoop filter table 280.

Figure 6A:
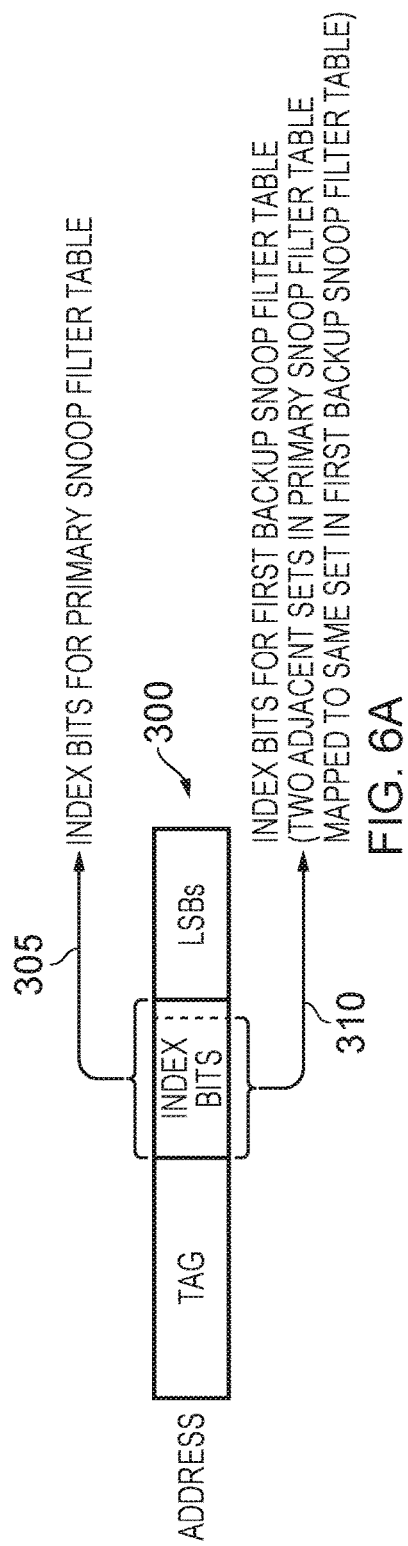
FIGS. 6A to 6D schematically illustrate different set determination functions that may be used in order to identify, for a given address, the relevant set within each snoop filter table, in accordance with various example implementations.

FIG. 6A illustrates how the set determination function may be performed in one example implementation where the sets are shared in the manner shown in FIG. 5. As indicated by the arrow 305, all of the index bits of the address 300 can be used to index into a set of the primary snoop filter table. However, as indicated by the arrow 310, when considering the first backup snoop filter table, the least significant index bit may be dropped, and as a result addresses that would have mapped to two adjacent sets in the primary snoop filter table will actually map to the same set in the first backup snoop filter table.

Figure 6B:
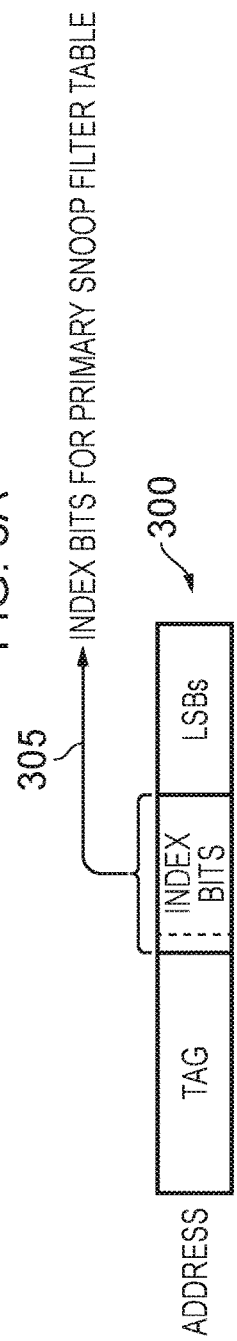

In some implementations it may be found that neighbouring sets may have correlated occupancy. For example, the address space may not be uniformly used, and certain portions of the address space may be heavily utilised, resulting in multiple adjacent sets in the primary snoop filter table both exhibiting high utilisation. If desired, then the set determination function can be modified so as to ensure that neighbouring sets in a higher level snoop filter table do not map to the same set in the adjacent lower level snoop filter table. For example, as shown in FIG. 6B, whilst, as shown by the arrow 305, the index into the primary snoop filter table may be generated in the same way as discussed earlier with reference to FIG. 6A, as shown by the arrow 315 the index bits chosen to generate the index for the first backup snoop filter table may be chosen differently to that shown in FIG. 6A. In particular, rather than dropping the least significant bit, the most significant bit could for example be dropped. This would mean that non-adjacent sets in the primary snoop filter table are mapped to the same set in the first backup snoop filter table. It should be noted that there are variants of FIG. 6B which could also achieve the same aim. For example, it does not need to be the most significant bit that is dropped, and could be another bit other than the least significant bit.

As another variant, as shown by the dotted arrow 317 in FIG. 6B, if desired one or more of the tag bits of the address could be used with one or more of the index bits to generate the index into the lower level snoop filter table. This may further improve flexibility in the design, by causing entries in a higher level set to have multiple candidate sets in a lower level snoop filter table.

Figure 6C:
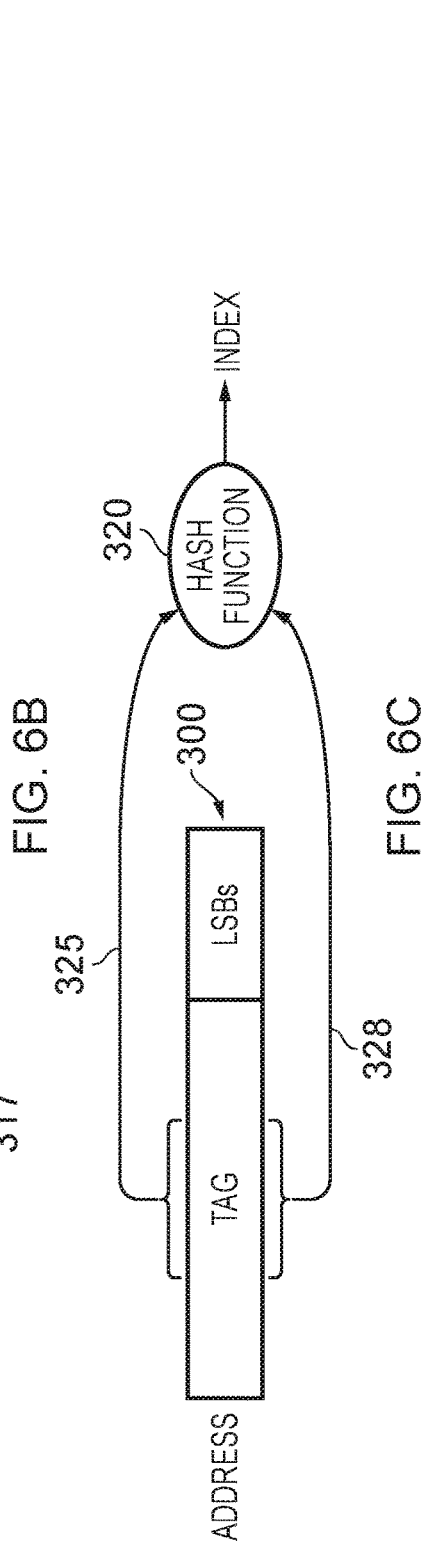

FIG. 6C shows another example implementation of the set determination function, where the index into a snoop filter table is determined by hashing some of the address bits. In such an implementation, there are no distinct index bits in the address, and the whole of the cache line address (this being labelled "tag" in FIG. 6C) would be stored within the snoop filter entry. A chosen number of the address bits, as shown by the lines 325, 328, are then used as an input to a hash function 320 in order to generate an index into the associated snoop filter table. By using a hash function, this can remove the correlation between adjacent sets.

Figure 6D:
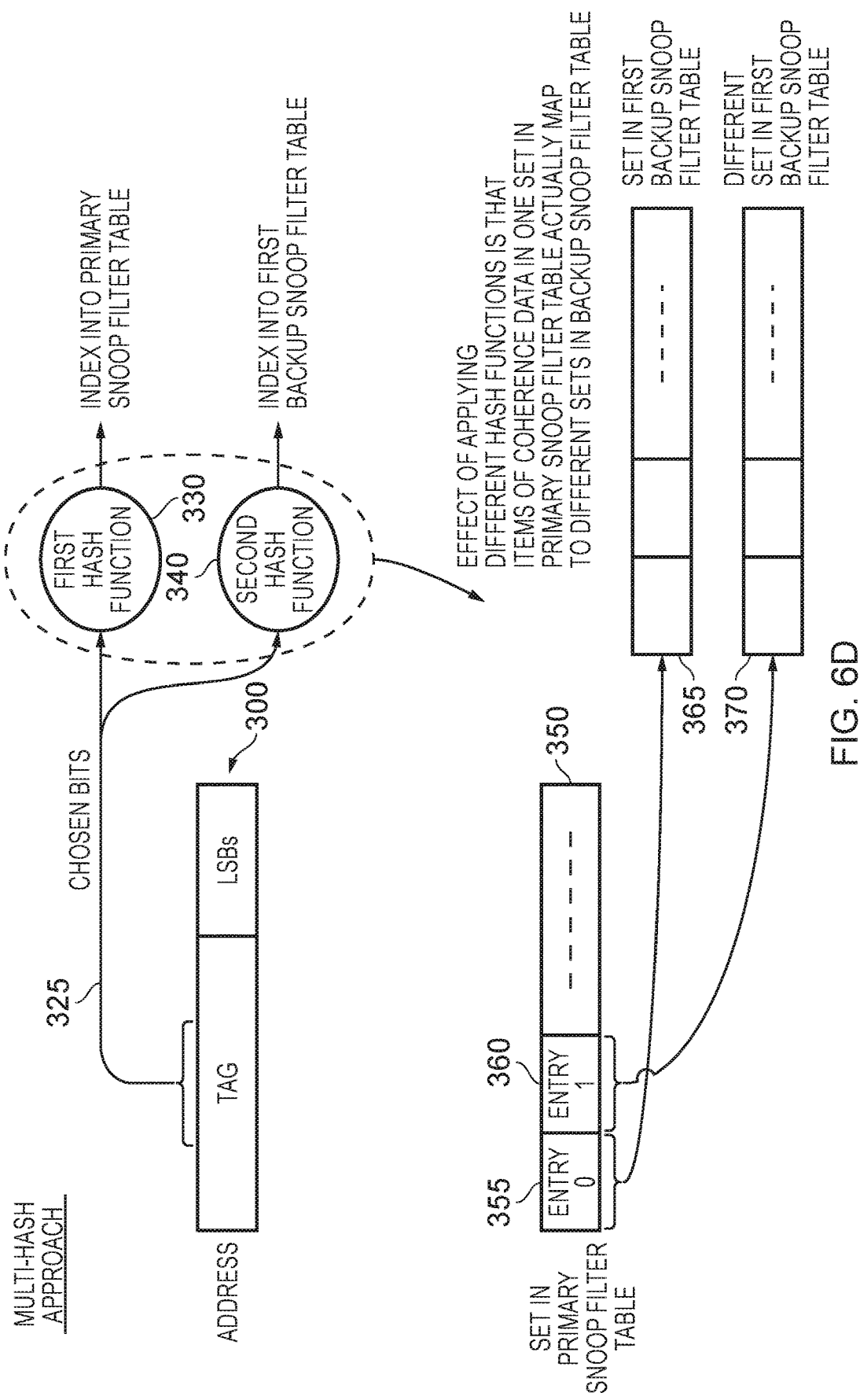

As shown in FIG. 6D, in accordance with another example implementation, a multi-hash approach may be used. In this example, the same bits may be used for each snoop filter table, as shown by the line 325 (or alternatively different bits may be used for each snoop filter table), and different hash functions 330, 340 are employed when generating the indexes into the snoop filter tables. This can serve to further remove any address correlation, in particular meaning that even individual entries 355, 360 within a particular set 350 in the primary snoop filter table may map to different sets 365, 370 in the first backup snoop filter table. If when seeking to allocate new coherence data no free entry is found in any table, then all of the existing entries in the identified set of the primary snoop filter table could be checked to see if there is free space in the adjacent lower level table, and if there is an entry could be migrated to the lower level table in order to free up space for the new coherence data. Such an approach could increase the probability of finding a free entry and thereby avoid eviction, but would add latency and reduce bandwidth when seeking to find such a victim entry to be demoted to a lower table, due to the multiple lookups required.

Figure 7:
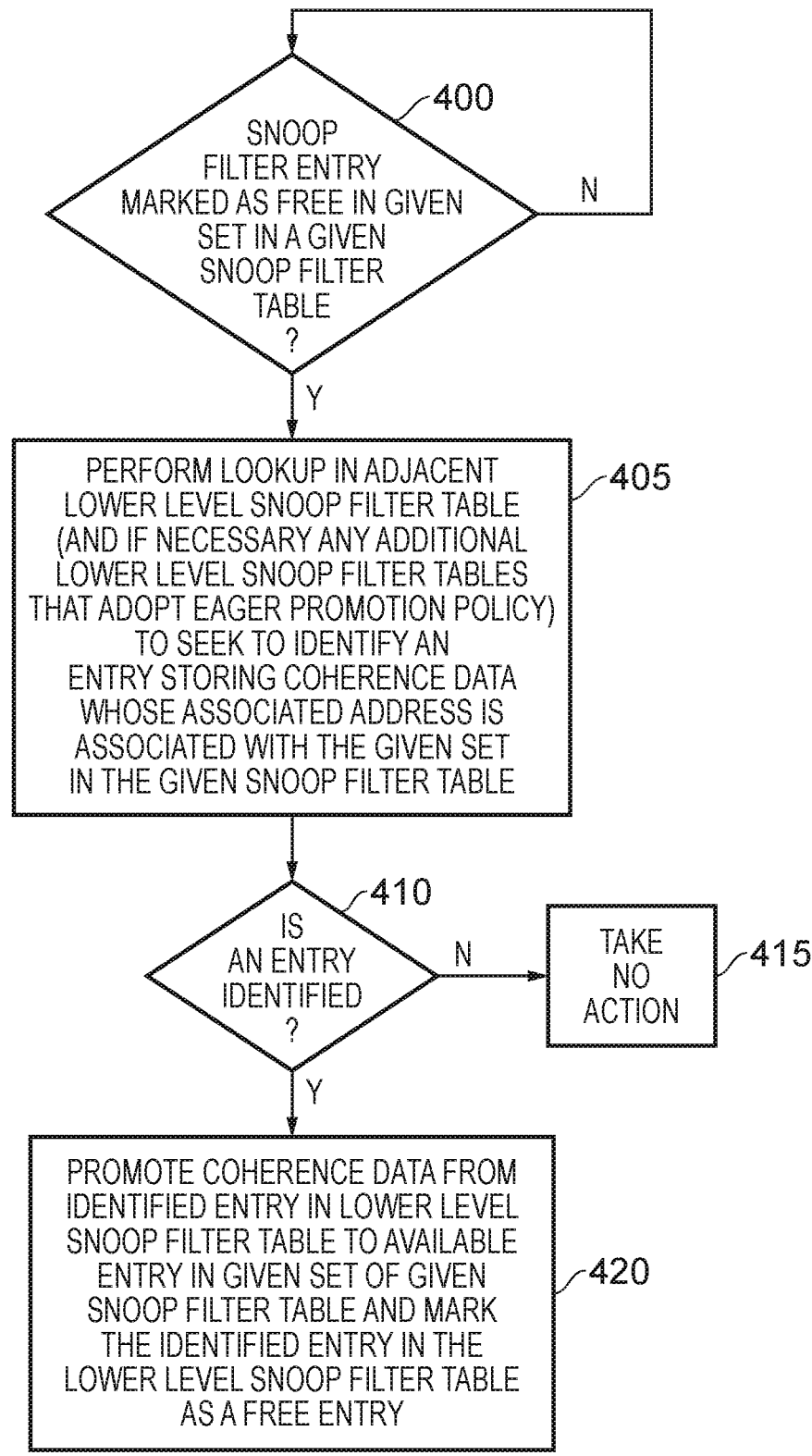
FIG. 7 is a flow diagram illustrating an eager promotion policy that may be used in one example implementation.

FIG. 7 is a flow diagram illustrating an eager promotion policy that may be applied between a pair of adjacent snoop filter tables in one example implementation. At step 400, it is determined whether there is a snoop filter entry marked as free in a given set in a given snoop filter table. This could arise for a variety of reasons, for example when none of the local caches store the data for the associated address identified in an entry any more, then the coherence data no longer needs to be maintained, and the valid bit can be cleared in that entry, rendering it a free entry for subsequent allocation. Whilst in one example implementation that entry may merely be retained as free until a subsequent allocation is required, at which point it can be populated, in accordance with the eager promotion policy it is determined whether there are any suitable entries in a lower level snoop filter table that could be promoted into the free entry in the given snoop filter table.

Accordingly, at step 405, a lookup is performed in the adjacent lower level snoop filter table to seek to identify an entry storing coherence data whose associated address would map to the given set in the given snoop filter table. If no such coherence data is found, then the lookup can be extended to each further lower level snoop filter table for which the eager allocation policy is adopted until suitable coherence data is found, or all relevant tables have been searched. At step 410, it is determined whether any entry was identified, and if not then as indicated by step 415, no action is taken. However, if an entry is identified, the process proceeds to step 420 where the coherence data is promoted from the identified entry in the lower level snoop filter table to the available entry in the given set of the given snoop filter table. As part of this promotion process, both the coherence data and the associated tag value will be migrated to the entry in the given set, with the valid bit then being set. In addition, the identified entry in the lower level snoop filter table can at that point be marked as free entry, for example by clearing the valid bit.

The benefit of such an approach is that it seeks to keep the backup entries in the backup snoop filter tables as free as possible. This is useful, as those entries are shared amongst multiple of the sets in the higher level snoop filter table, and accordingly by populating the backup snoop filter tables as little as possible, this reduces the chance that an eviction may be needed in due course.

Figure 8:
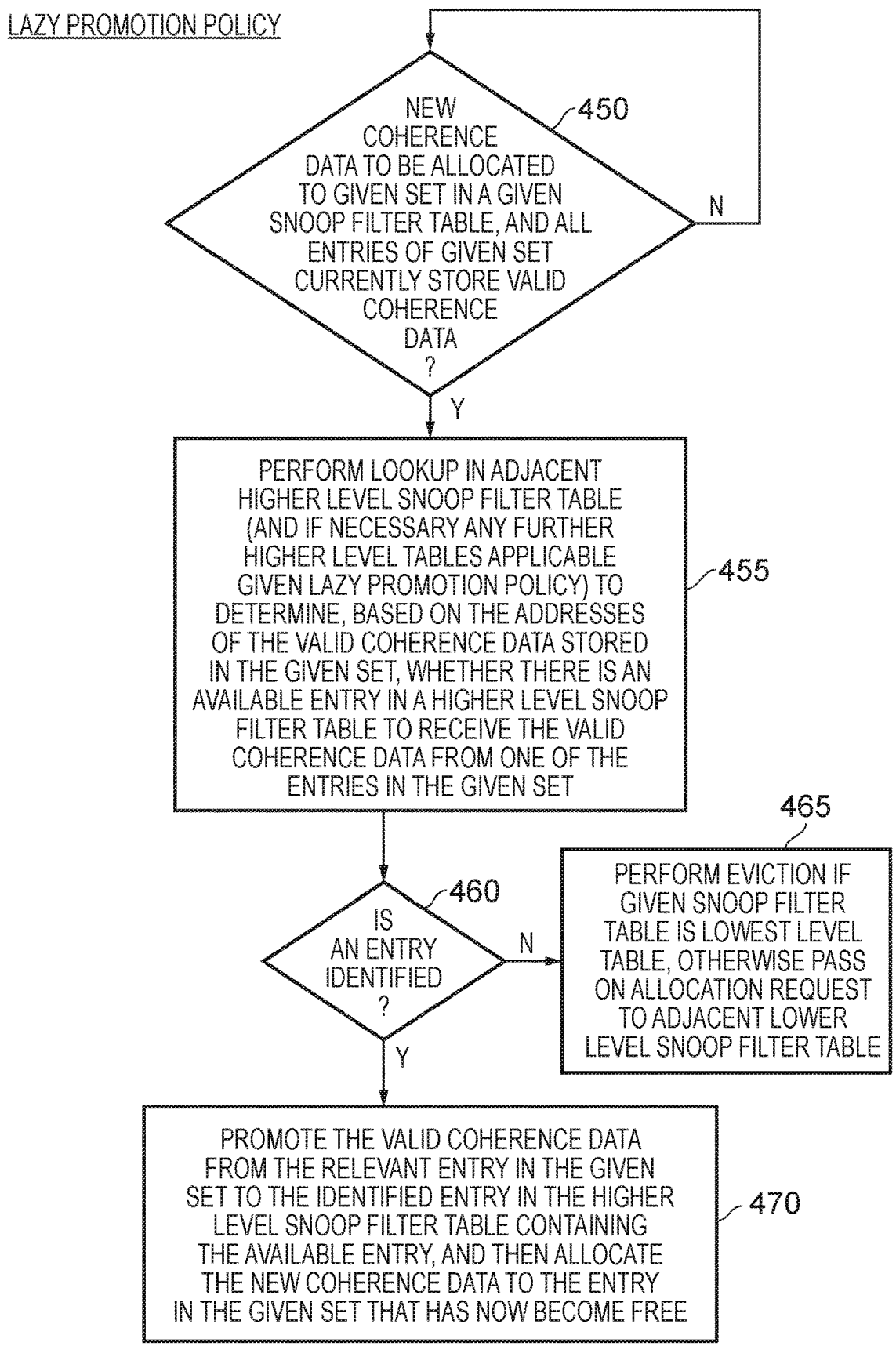
FIG. 8 is a flow diagram illustrating a lazy promotion policy that may be employed in one example implementation.

As an alternative to using an eager promotion policy, a lazy promotion policy can instead be employed if desired, and FIG. 8 is a flow diagram illustrating the steps performed when implementing such a lazy promotion policy between a pair of adjacent snoop filter tables, in accordance with one example implementation. At step 450, it is determined whether there is new coherence data to be allocated to a given set in a given snoop filter table, in a situation where all of the entries of the given set currently store valid coherence data. If that condition is detected, then at step 455, one or more lookup operations are performed in the adjacent higher level snoop filter table to determine, based on the addresses of the valid coherence data stored in the given set, whether there is an available entry in the adjacent higher level snoop filter table to receive the valid coherence data from one of the entries in the given set. As will be apparent from the earlier discussions, the entries in the given set will typically map to more than one set in the higher level snoop filter table, and accordingly lookups may be required in multiple of the sets in the higher level snoop filter table.

If no available entry is found, then the search can be extended to each further higher level snoop filter table for which the lazy allocation policy is applicable, until either an available entry is found or all relevant tables have been searched. Hence, purely by way of specific example, consider an implementation where there are three snoop filter tables labelled L1, L2 and L3, where L1 is the primary snoop filter table. It is assumed that L2 and L3 both adopt the lazy allocation policy, and the process of FIG. 8 is being performed due to an identified set in L3 being full. Assuming ½ consolidation, then two sets may be searched in the L2 snoop filter table for an available entry, and if no available entry is found four sets in the L1 snoop filter table may be searched.

At step 460, it is determined whether an entry has been identified, and if not then at step 465 it is decided to perform an eviction of an existing snoop filter entry if the given snoop filter table is the lowest level table. Otherwise, the allocation request may be passed on to an adjacent lower level snoop filter table.

However if an entry is identified at step 460, then the process proceeds to step 470 where the valid coherence data from the relevant entry in the given set is promoted to the identified entry in the higher level snoop filter table that contains the available entry, thereby freeing up an entry in the given set. That freed up entry is then allocated for the new coherence data.

The use of such a lazy promotion policy may be of assistance in the average case, because any free entry in a higher level snoop filter table may be filled by a new request without the relevant set at a lower level snoop filter table ever filling up. However, this lazy strategy does involve multiple additional lookups when a set at the deepest level is full.

Whilst in one example implementation the eager promotion policy may be used between each snoop filter table, or instead the lazy promotion policy may be used between each snoop filter table, in an alternative implementation both the eager and lazy promotion policies can be used at different levels in the hierarchy. For example, in a system that has three snoop filter tables, the lazy promotion policy may be applied between the primary snoop filter table and the first backup snoop filter table, whilst the eager promotion policy is used between the first backup snoop filter table and the second backup snoop filter table. Alternatively, the eager promotion policy could be used between the primary snoop filter table and the first backup snoop filter table, and the lazy promotion policy could be used between the first backup snoop filter table and the second backup snoop filter table.

Figure 9:
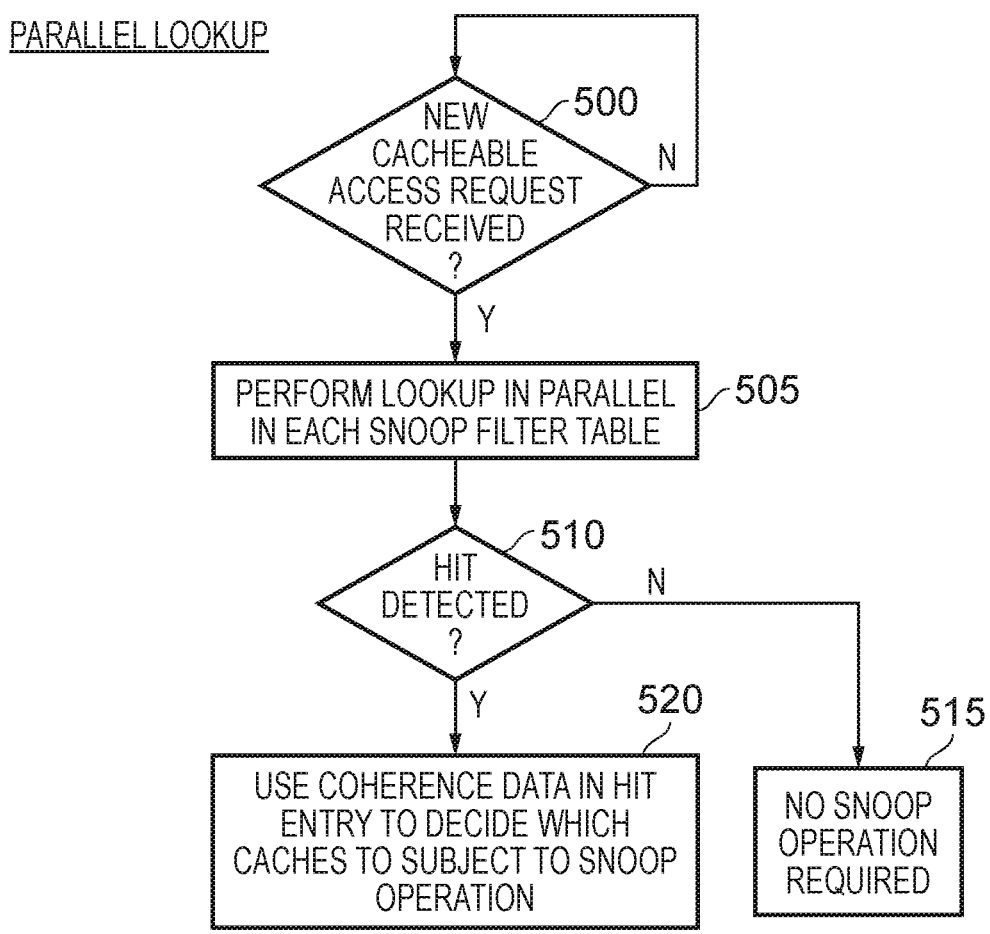
FIG. 9 is a flow diagram illustrating a parallel lookup procedure that may be employed within the snoop filter storage in accordance with one example implementation.

The way in which the various snoop filter tables are accessed in response to a request specifying a cacheable memory address may vary dependent on implementation. In one example implementation, as shown by the flow diagram of FIG. 9, a parallel lookup process can be performed. Hence, at step 500, it may be detected whether a new cacheable access request has been received, and if so then at step 505 the snoop control circuitry 75 may perform a lookup in parallel in each of the snoop filter tables. As a result of those lookups, it can then be determined at step 510 whether a hit has been detected in an entry of one of the snoop filter tables. If a hit is not detected, then it is determined at step 515 that no snoop operation is required. Conversely, if a hit is detected, then the coherence data in the hit entry is used to decide which caches to subject to the snoop operation at step 520.

Using such a parallel lookup procedure may improve latency of individual requests, but is likely to be less power efficient as lookups will be performed that are in fact not required in some situations.

Figure 10:
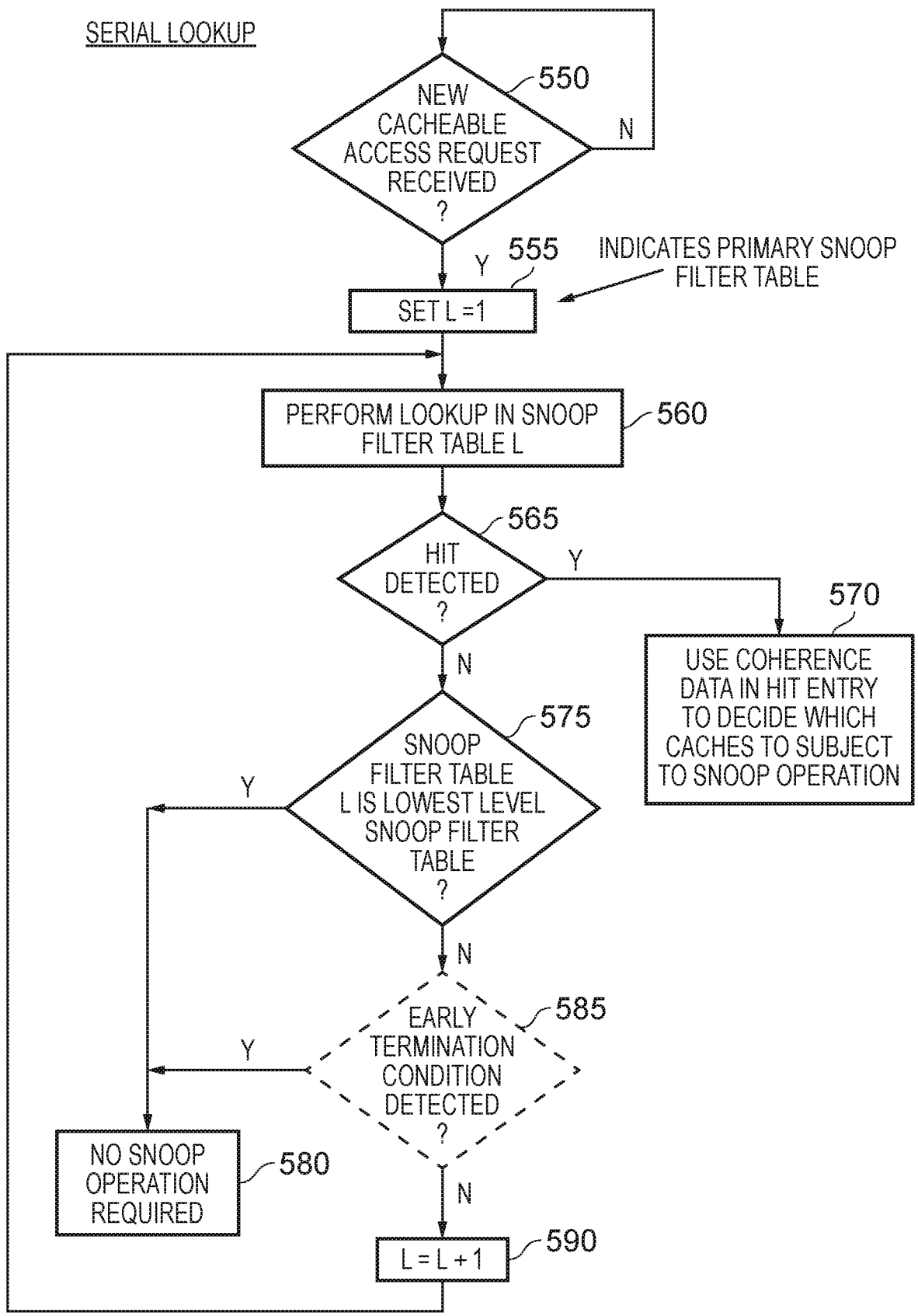
FIG. 10 is a flow diagram illustrating a serial lookup procedure that may be employed within the snoop filter storage in accordance with an alternative example implementation.

In accordance with an alternative technique shown in FIG. 10, the lookup operation is performed in a serial manner. Hence, at step 550 it is determined whether a new cacheable access request has been received, and if so then a parameter L is set equal to 1 at step 555, a value of 1 indicating the primary snoop filter table.

Thereafter, at step 560 a lookup is performed in the snoop filter table L, and it is then determined at step 565 whether a hit has been detected. If so, then at step 570 the coherence data in the hit entry is used to decide which caches to subject to the snoop operation. Accordingly, it will be seen that if a hit is actually detected in the primary snoop filter table, then none of the other snoop filter tables need to be subjected to a snoop operation, thereby reducing power consumption. In the illustrated example it is assumed that all coherence data for a cache line will be stored in a single entry within the snoop filter table.

If at step 565 it is determined that a hit has not been detected, then at step 575 it is determined whether snoop filter table L is the lowest level snoop filter table. If it is, then the process proceeds to step 580 where it is determined that no snoop operation is required. However, if it is determined that the snoop filter table L is not the lowest level snoop filter table then in one example implementation the value of L may merely be incremented at step 590, with the process then returning to step 560.

However, as indicated by the dotted box 585 in FIG. 10, in one example implementation an optional step may first be performed, namely to decide whether an early termination condition has been detected. As will be discussed in more detail later, there are a number of ways in which the early termination condition could be detected, but when it is detected this indicates that the coherence data is not stored in any lower level snoop filter tables, and accordingly lookups in those lower level snoop filter tables are not required. Accordingly, if the early termination condition is detected at step 585, then the process proceeds to step 580 where it is determined that no snoop operation is required. Otherwise, the process proceeds to step 590 in order to increment the parameter L, and then return to step 560.

By using a serial lookup approach, this can reduce power consumption, since not all snoop filter tables need to be subjected to a lookup operation for all access requests. Further, the use of a sequential access approach may improve throughput in some designs, for example if the snoop control circuitry is pipelined so that multiple requests can be in process of being actioned simultaneously (for example whilst a lookup is being performed in one snoop filter table with respect to a first access request, a different access request may be used to perform a lookup operation in a different snoop filter table).

Whilst in one example implementation, all of the lookups may either be performed in parallel or serially, if desired a mixture of approaches could be used. For example, a lookup could first be performed within the primary snoop filter table, and in the event of a miss, all of the remaining snoop filter tables could be accessed in parallel if desired.

Figure 11A:
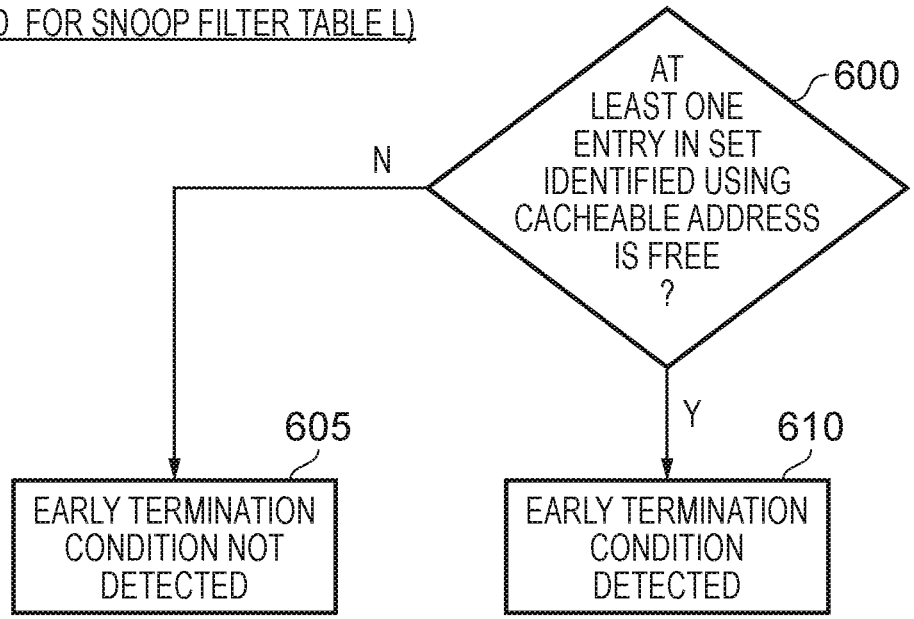
FIGS. 11A and 11B illustrate two examples of the early termination condition referred to in FIG. 10, whilst

As noted above, many accesses may not require a lookup in at least the lowest level snoop filter table, hence mitigating the latency to memory. This latency can be further improved if steps are implemented to enable an early termination condition to be detected. As mentioned earlier, there are various ways in which the early termination condition could be detected. FIG. 11A illustrates one example scenario which can be employed when the eager promotion policy is used for the snoop filter tables. At step 600, it is determined whether there is at least one entry in the set of snoop filter table L identified using the cacheable address that is free. If so, this means that there is no coherence data in a lower level snoop filter table that would map to the identified set, and accordingly the early termination condition can be detected at step 610, avoiding any further lookups. However, if at step 600 it is determined that all of the entries in the identified set currently store valid coherence data (i.e. none of the entries are free), then at step 605 the early termination condition is not detected.

In the example of FIG. 11A it is assumed that the eager promotion policy is used at each level in the hierarchy. If one or more lower level tables instead used the lazy promotion policy then they may still need to be searched, and hence the "yes" path from step 600 may just cause one or more lower levels, but not all, to be bypassed, resulting in a bypass condition rather than an early termination condition, with the process then returning to step 560 of FIG. 10 for a lookup to be performed in the next snoop filter table (i.e. the first one that could not be bypassed).

Figure 11B:
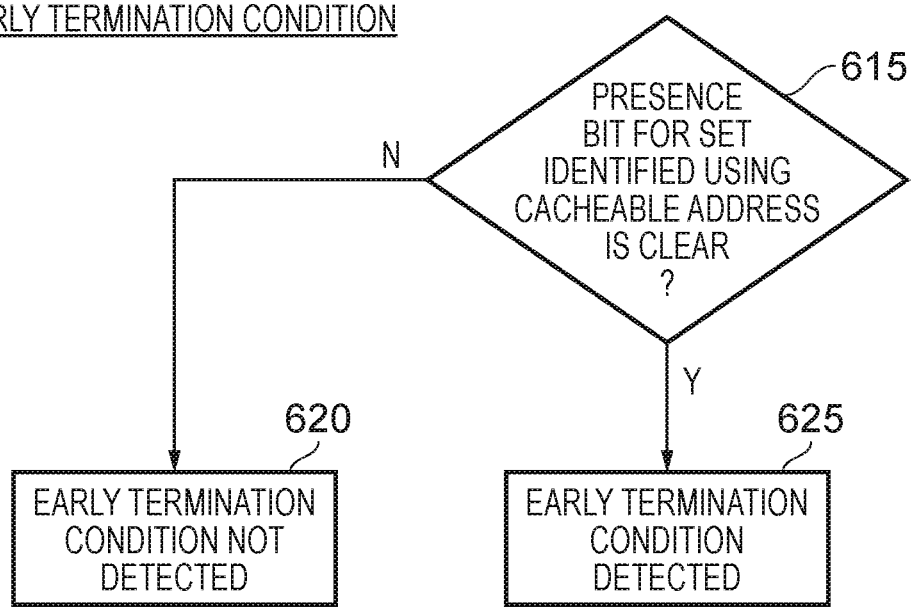
Figure 11C:
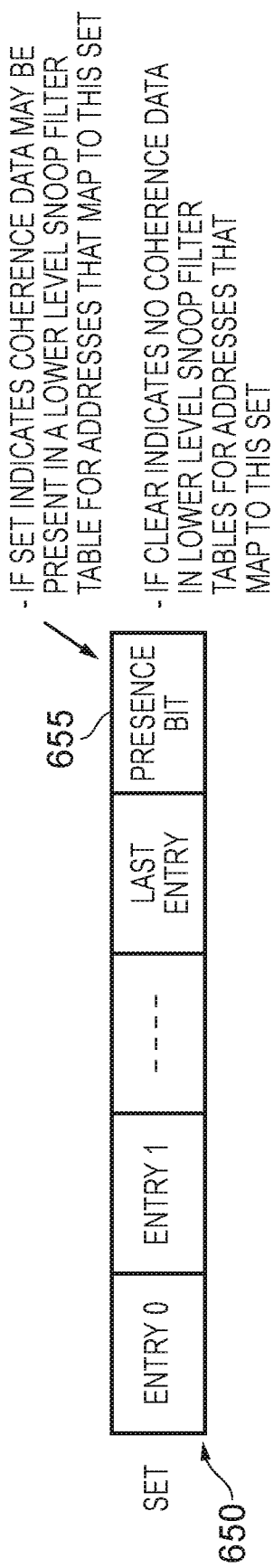
FIG. 11C illustrates how the presence bit referred to in FIG. 11B may be provided in association with each set, in accordance with one example implementation.

FIG. 11B illustrates another way in which an early termination condition can be detected, for an implementation where each set includes a presence bit, as shown for example in FIG. 11C. Hence, in this example the set 650 includes each of the entries used to store coherence data, and a presence bit 655. If the presence bit is set, this indicates that coherence data may be present in a lower level snoop filter table for addresses that map to this set. Hence, for example as soon as an allocation occurs into a lower level snoop filter table due to all of the entries in the set 650 being full, then the presence bit may be set.

In one example implementation the set state of the presence bit may identify that coherence data is definitely present in a lower level snoop filter table for addresses that map to the associated set. However, in an alternative implementation the design could lazily clear the presence bit, and in that case the set states merely indicates that coherence data may be present in a lower level snoop filter table for addresses that map to the associated set. Conversely, irrespective of the implementation regarding updating of the set state, if the presence bit is clear, this means that no coherence data has been allocated into the lower level snoop filter tables for addresses that map to the associated set.

Returning to FIG. 11B, then at step 615 it can be determined whether the presence bit for the set identified using the cacheable address is clear. If it is, then at step 625 the early termination condition is considered detected, whereas otherwise at step 620 the early termination condition is considered not detected.

Figure 12A:
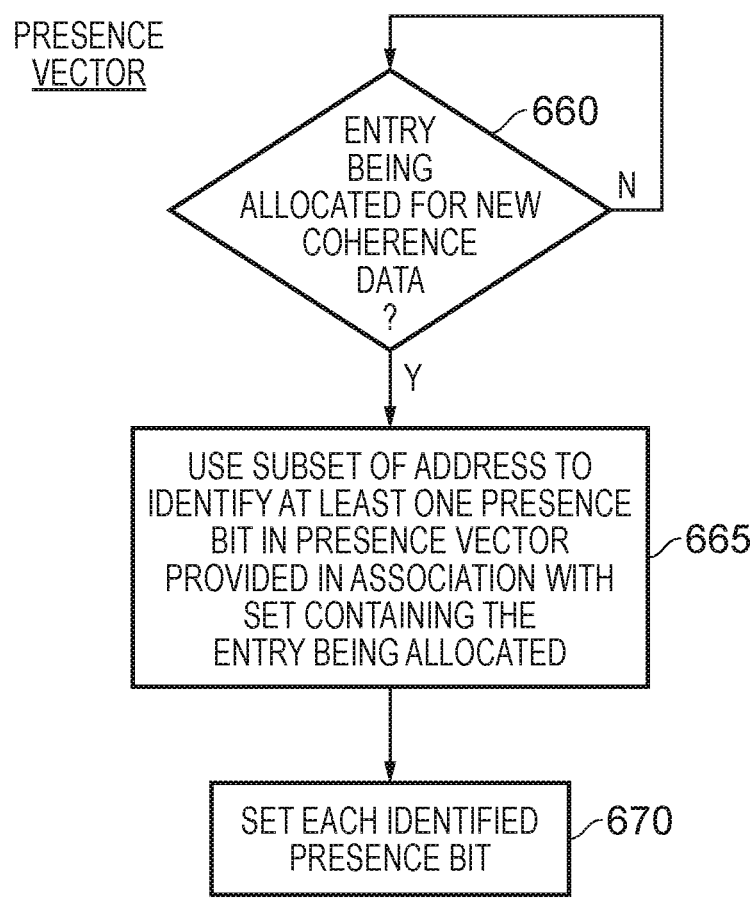
FIGS. 12A and 12B are flow diagrams illustrating the use of a presence vector in accordance with one example implementation.
Figure 12B:
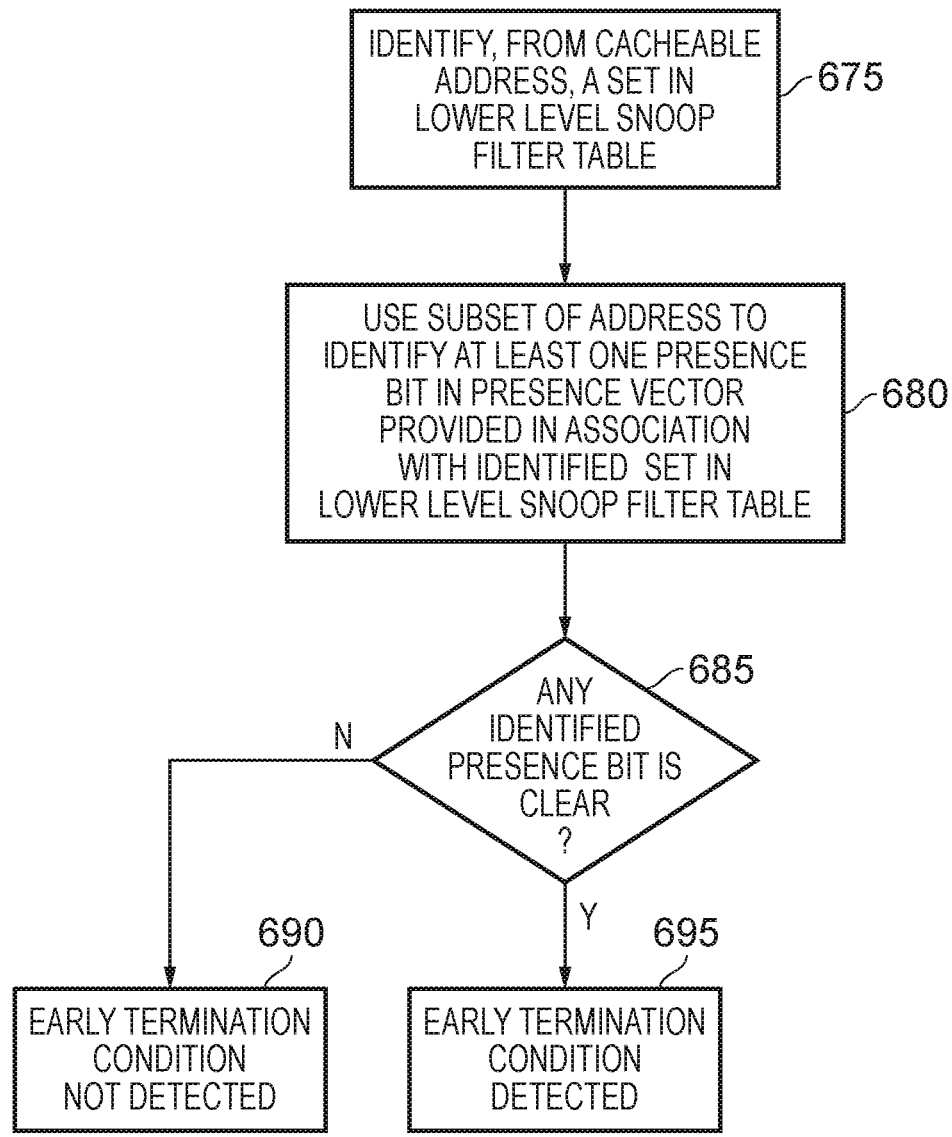

FIGS. 12A and 12B illustrate how a presence vector may be implemented, and that presence vector then used to detect an early termination condition, in accordance with one example implementation. In accordance with the presence vector approach, a presence vector is provided for each set in a lower level snoop filter table, the vector comprising multiple presence bits. When an entry is being allocated within such a lower level snoop filter table to store coherence data, then a subset of the address bits (for example some of the tag bits) are used to identify at least one presence bit within the vector, and that bit is then set. This process is shown in FIG. 12A.

Hence, if at step 660 it is determined that an entry is to be allocated within the snoop filter table for new coherence data, then at step 665 a subset of the bits of the address are used to identify at least one presence bit in the presence vector provided in association with the set that contains the entry being allocated. For each identified bit, then that identified presence bit is set at step 670.

FIG. 12B is a flow diagram illustrating how the presence vector can be referred to when assessing the early termination condition in FIG. 10, in accordance with one example implementation. At step 675, a set in the adjacent lower level snoop filter table is identified based on the cacheable address. Thereafter, a subset of the address bits are used at step 680 to identify at least one presence bit in the presence vector provided in association with that identified set in the lower level snoop filter table. It is then determined at step 685 whether any identified presence bit is clear. If so, the early termination condition is detected at step 695, whereas otherwise at step 690 the early termination condition is not detected. The reason why an identified presence bit being clear can be used to indicate the early termination condition is illustrated by way of example with reference to FIG. 13.

Figure 13:
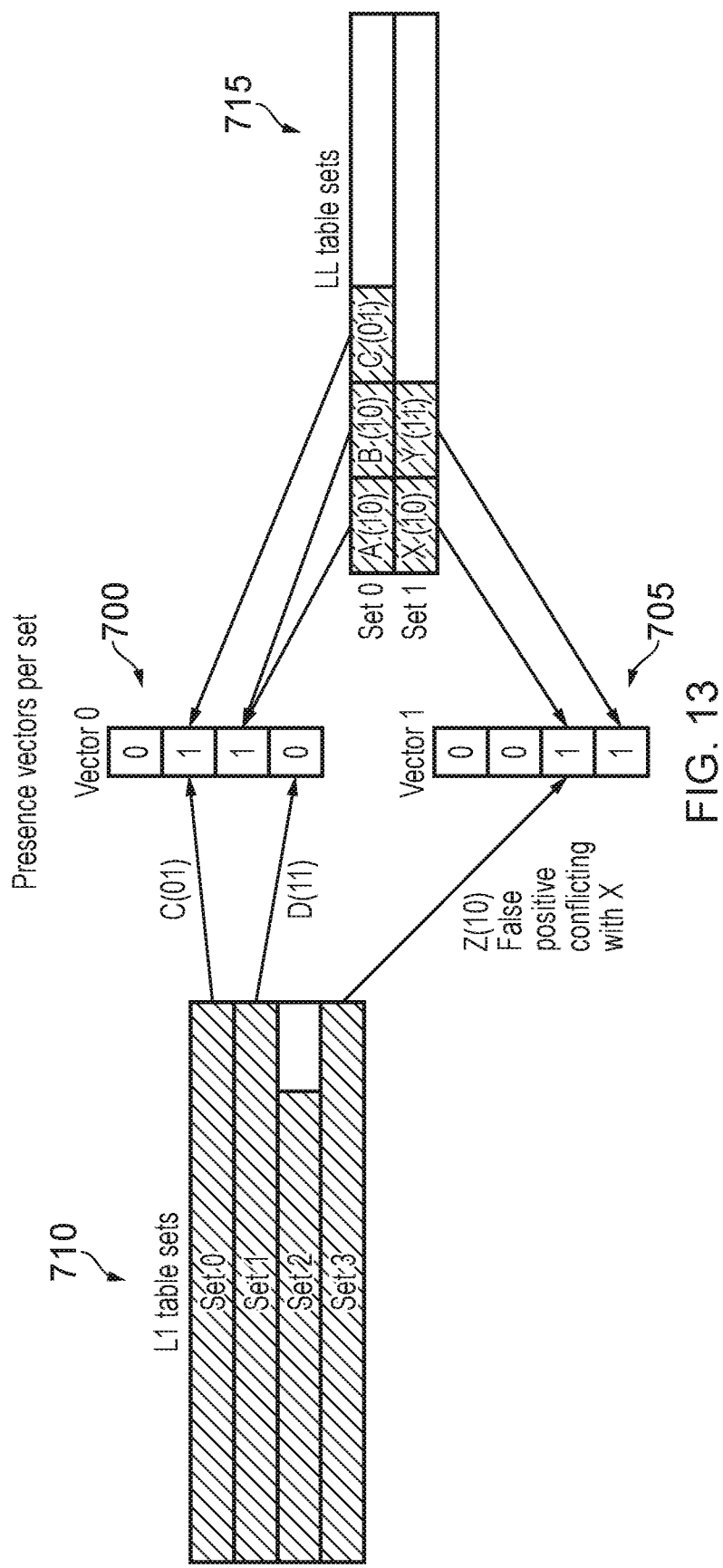
FIG. 13 illustrates one example form of the presence vector.

In the example of FIG. 13, a 4-bit presence vector implementation is shown. In this example, there is a single backup snoop filter table 715 and a primary snoop filter table 710, but the technique can be employed in association with any backup snoop filter table. For ease of illustration, only two of the sets in the backup snoop filter table 715 are shown, and only four of the sets in the primary snoop filter table 710. For each of the two illustrated sets in the backup snoop filter table, a 4-bit presence vector 700, 705, respectively, is provided. Hence, vector 0 700 holds coherence data for any cache line that maps to set 0 in the backup snoop filter table 715, and similarly vector 1 705 holds coherence data for any cache line that maps into set 1 of the backup snoop filter table 715. However, as will be apparent from the earlier discussion, in one example implementation coherence data is only allocated into an entry in the lower level snoop filter table when the relevant set in the primary snoop filter table is already full.

In the example shown in FIG. 13, it is assumed that sets 0 and 1 in the primary snoop filter table 710 map to set 0 in the backup snoop filter table 715, and sets 2 and 3 in the primary snoop filter table 710 map to set 1 in the backup snoop filter table 715. It is also assumed that at least sets 0, 1 and 3 in the primary snoop filter table 710 are fully occupied with valid coherence data, and that some additional allocations have hence been made in sets 0 and 1 of the backup snoop filter table 715. In particular, entries in set 0 have been made for addresses identifying cache lines A, B and C, and entries have been allocated in set 1 for addresses identifying cache lines X and Y.

Each time an allocation is made into one of the sets in the backup snoop filter table 715, two bits from the tag portion of the address for the relevant cache line are used to identify one of the four presence bits in the presence bit vector of the associated set, and that identified bit is then set. As shown in the example in FIG. 13, it is assumed that the relevant two bits of the tag portion of the address for cache lines A and B identify the third presence bit, and the relevant two bits of the tag portion of the address for cache line C identify the second presence bit, and accordingly the current state of the presence vector 0 is 0110. Similarly, based on the two bits of the tag portion of the addresses for cache lines X and Y, the last two bits in vector 1 have been set, and accordingly vector 1 is currently 0011.

FIG. 13 illustrates a case where a new access request is received specifying an address for cache line C, and a lookup is to be performed in the backup snoop filter table 715 (for example because a miss has occurred within the corresponding set (set 0) in the primary snoop filter table 710, due to the fact that none of the entries in that set store coherence data for the address of cache line C). Two bits from the tag portion of the address for cache line C are then used to identify one of the bits in the presence vector 0 700 associated with set 0 of the backup snoop filter table (since set 0 in the backup snoop filter table 715 is the set that is identified using the address for cache line C). At this point, it is identified that the relevant presence bit is set, and accordingly it is decided that a lookup should be performed in the backup snoop filter table 715. This is indeed appropriate behaviour, since as shown in FIG. 13 coherence data for the cache line C does exist in the backup snoop filter table 715, so this would be a true positive situation.

FIG. 13 also considers another example where a request specifies an address for cache line D, and that request misses when a lookup is performed in the relevant set (in this case set 1) of the primary snoop filter table 710. From the relevant two tag bits of the address for cache line D, the last presence bit in the vector 0 700 is identified, and that bit is clear (i.e. a logic 0 value). As a result, it is determined that no lookup is required in the backup snoop filter table 715. As a result, power consumption is reduced, and also latency for access to memory is reduced. All negative results when accessing the presence vectors are true negatives, i.e. it is known for certain that coherence data for the required address is not present in the backup snoop filter table 715.

As a third example, FIG. 13 illustrates a situation where an access request specifies an address for cache line Z, and a lookup in the relevant set of the primary snoop filter table 710 (in this example set 3) produces a miss. The two bits of the tag portion of the address identify the third entry in the relevant vector 705 for the set 1 that will be accessed based on the address for cache line Z, thereby indicating that a lookup should be performed in set 1 of the backup snoop filter table 715. However, as shown in FIG. 13, coherence data for cache line Z is not in the backup snoop filter table 715, so this vector access results in a false positive, due to sharing some tag bits with the corresponding address for cache line X. These false positives may reduce the effectiveness of the vector filter, but do not result in any incorrect operation.

In order to reduce the number of false positive events, a larger vector filter per set could be used, for example by increasing the vector size from four bits to eight bits. A smart eviction and allocation strategy for the backup snoop filter table 715 can also be employed to reduce false positives, as will be discussed later with reference to the flow diagrams of FIGS. 15A and 15B.

The vector filter can be readily cleared to maintain precise information. In particular, when an entry is installed into the backup snoop filter table 715, the corresponding bit in the vector filter gets set. Whenever an entry is evicted from the backup snoop filter 715, the relevant tag bits of all valid entries in that set can be checked to see if the relevant bits from their tag conflict with the relevant bits from the evicted tag. In each of these cases, a full tag match for all ways of the set would already be required as part of the lookup operation, so pulling out the result of this partial tag match is straightforward. If no other tag in the set maps to the same bit of the bit vector, then the bit in the bit vector can be cleared as a result of the eviction. Otherwise, the bit must remain set to 1.

Figure 14:
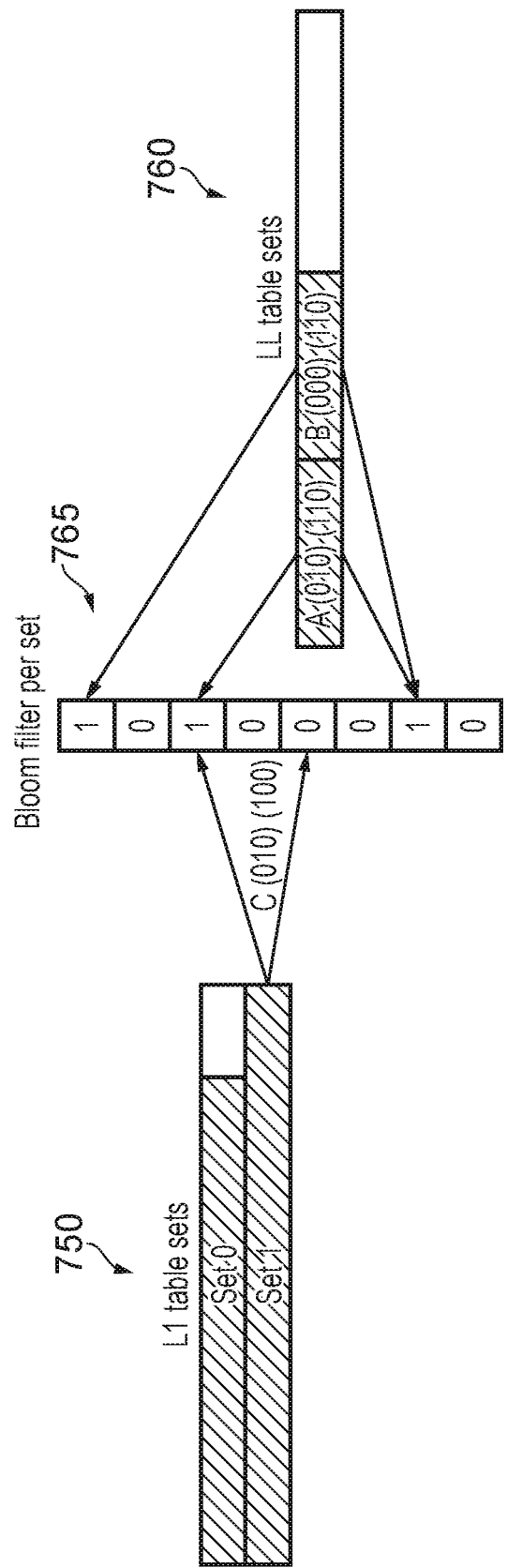
FIG. 14 illustrates another example form of the presence vector, where a Bloom filter design is utilised.

As shown in FIG. 14, if desired, the vector filter can be implemented as a Bloom filter 765. In this example, for simplicity, only a single Bloom filter is shown, for set 0 760 in the backup snoop filter table. FIG. 14 also shows the corresponding sets 0 and 1 750 from the primary snoop filter table, which map to set 0 in the backup snoop filter table. A Bloom filter design would reduce false positives by causing multiple bits to be accessed per entry in the lower level snoop filter table 760. In the example shown in FIG. 14, two different combinations of tag bits are used to identify two different bits in the Bloom filter for each address for which coherence data is allocated into an entry in the associated set of the backup snoop filter table. In this example, coherence data has been allocated for cache lines A and B, resulting in three bits in the bit vector being set as shown. Again it is assumed that a lookup is performed in the primary snoop filter table 750 for an address corresponding to cache line C, and again it is assumed that a miss occurs. Using the two different combinations of tag bits for the address of cache line C, this identifies the two presence bits shown in FIG. 14, one of which is set and one of which is clear. Since at least one of the access bits is clear, this indicates a negative result, and identifies that a lookup is not required in the backup snoop filter table. This hence prevents a false positive that might otherwise have occurred using the approach discussed earlier with reference to FIG. 13.

The Bloom filter design could still readily be managed without pollution of the bit vector. When an entry is evicted from the backup snoop filter table, the Bloom filter vector for that set could simply be recomputed based on the tags that were already accessed for the tag matching operation during the lookup operation. The use of such vector filters may add some area to the multi-level snoop filter design, diminishing some of the area savings achieved as a result of that multi-level design. However, the benefits in terms of power consumption saving and latency reduction that can be achieved from using such presence vectors may be considered worthwhile, even given the additional area required to implement those filters. By way of specific example, a 32-bit (4 byte) presence vector/Bloom filter per set may perform well for a 16-way set associative backup snoop filter table, whilst the set itself may use 192 bytes of memory. In one example implementation, the backup snoop filter table also contains fewer sets than the primary snoop filter table, so the area overhead of the vector filters is relatively low.

Figure 15A:
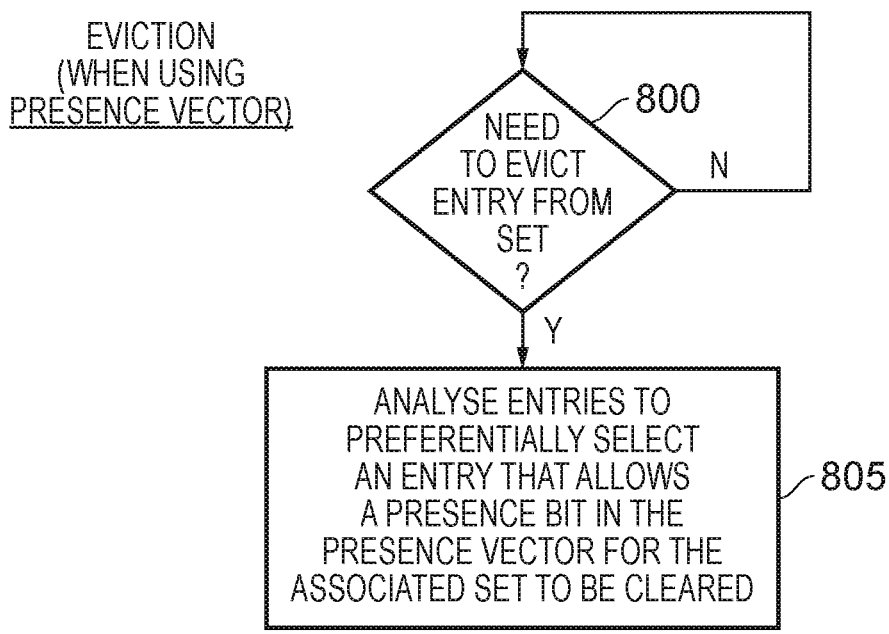
FIGS. 15A and 15B are flow diagrams illustrating eviction and migration processes, respectively, when using presence vectors, in accordance with one example implementation.

As discussed earlier, the eviction and allocation strategies used for a backup snoop filter table can be arranged to take into account the use of presence vectors, with the aim of seeking to reduce false positives. The technique that may be used for eviction in one example implementation is shown in FIG. 15A. When at step 800 it is decided that it is necessary to move or evict an entry from a set in the backup snoop filter table, then at step 805 the entries within that set are analysed to preferentially select an entry that allows a presence bit in the presence vector for the associated set to be cleared. Hence, considering the example of set 0 in the backup snoop filter table 715 of FIG. 13, it may be decided to evict the entry for cache line C, since this would allow the second bit of vector 0 to be cleared, whereas if either of the entries for cache line A or cache line B were chosen, this would not be possible, since the other retained valid entry would still require the associated presence bit to remain set.

Figure 15B:
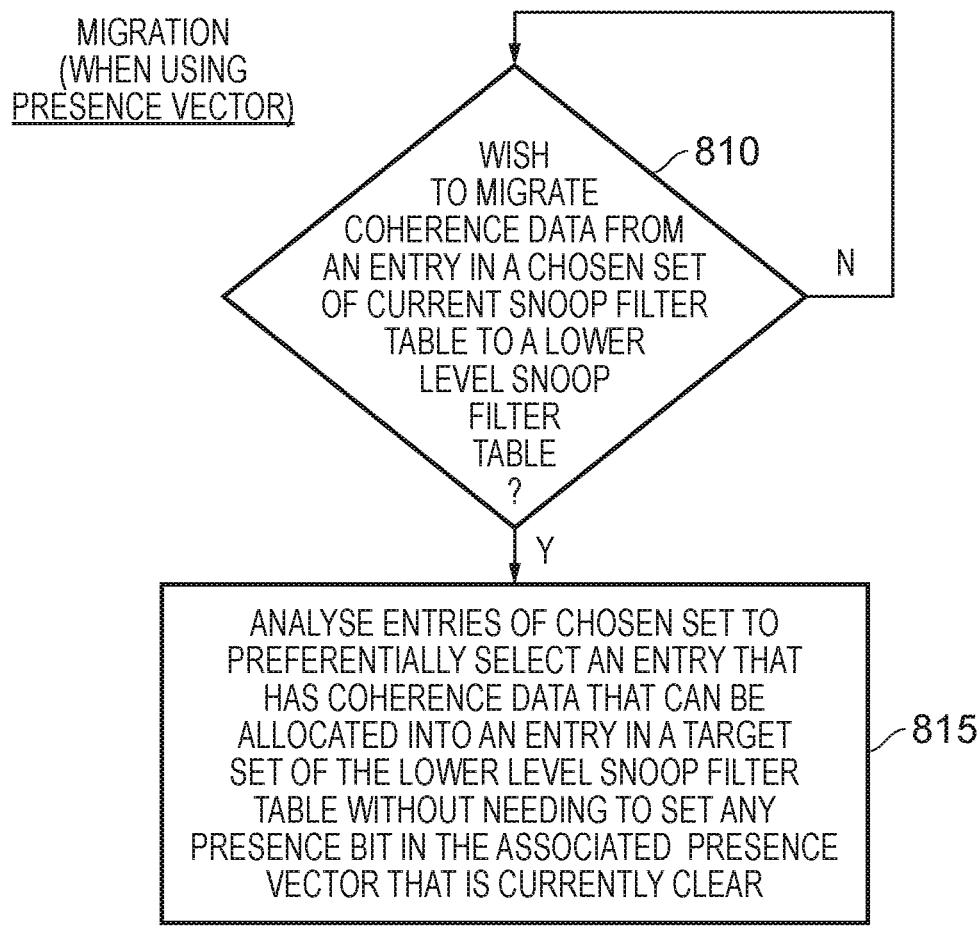

FIG. 15B illustrates a similar scheme that may be used when migrating a line from the primary snoop filter table to the backup snoop filter table. At step 810, it is determined if there is a wish to migrate coherence data from an entry in a chosen set of a current snoop filter table to a lower level snoop filter table, and when this is the case then at step 815 the entries of the chosen set are analysed to preferentially select an entry that has coherence data that can be allocated into an entry in a target set of the lower level snoop filter table without needing to set any presence bit in the associated presence vector that is currently clear. Hence, again considering FIG. 13, if set 0 in the primary snoop filter table 710 stored entries for cache lines E and F, but the relevant tag bits of the address for cache line E pointed to the second bit in vector 0 whilst the relevant tag bits of the address for cache line F pointed to the final bit of vector 0, it may be determined appropriate to migrate the coherence data for cache line E into set 0 of the backup snoop filter table 715, as the second presence bit is already set, and accordingly such a migration will not cause any further bits in the presence vector to be set. As a result, an entry from the primary snoop filter table 710 can then be pushed to the backup snoop filter table without increasing the chances of a future false positive scenario.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus to receive requests from a plurality of processing units, where multiple of the plurality of processing units have associated cache storage, the apparatus comprising:
a snoop unit to implement a cache coherency protocol when a request received by the apparatus identifies a cacheable address within memory;
the snoop unit having snoop filter storage comprising a plurality of snoop filter tables organised in a hierarchical arrangement, wherein the plurality of snoop filter tables comprise a primary snoop filter table at a highest level in the hierarchy, and each snoop filter table at a level in the hierarchy other than the highest level forms a backup snoop filter table for an adjacent snoop filter table at a higher level in the hierarchy;
wherein:
each snoop filter table is arranged as a multi-way set associative storage structure to provide a plurality of entries, and each backup snoop filter table has a different number of sets than are provided in the adjacent snoop filter table at the higher level in the hierarchy;
each entry in the snoop filter tables is used to store, for an associated address, coherence data used to determine which cache storages provided within the multiple processing units need to be subjected to a snoop operation in response to a request specifying that associated address; and
the snoop unit further comprises snoop control circuitry to control allocation of coherence data into entries of the snoop filter tables, wherein the snoop control circuitry is arranged, when new coherence data is to be allocated into the snoop filter storage, to apply an allocation policy to determine into which of the plurality of snoop filter tables the new coherence data is allocated.

2. The apparatus as claimed in claim 1, wherein the allocation policy applied by the snoop control circuitry causes coherence data to be preferentially allocated into the primary snoop filter table but for a backup snoop filter table to be utilised to provide an entry into which coherence data is allocated in the event that, when the new coherence data is to be allocated into the snoop filter storage, a set in the primary snoop filter table identified using the associated address of the new coherence data has no available entry.

3. The apparatus as claimed in claim 1 or claim 2, wherein each backup snoop filter table has fewer sets than are provided in the adjacent snoop filter table at the higher level in the hierarchy.

4. The apparatus as claimed in claim 3, wherein the number of sets in each backup snoop filter table is ½N times the number of sets provided by the adjacent snoop filter table at the higher level in the hierarchy, wherein N is a positive integer.

5. The apparatus as claimed in claim 4, wherein N is settable independently for each backup snoop filter table.

6. The apparatus as claimed in claim 3, wherein:
the snoop control circuitry is arranged, for each snoop filter table, to apply a set determination function using bits within a specified address to identify a set in that snoop filter table that the specified address is associated with; and
the set determination function is arranged such that addresses that are associated with a given set in a given backup snoop filter table comprise addresses that are associated with at least two sets in the adjacent snoop filter table at the higher level in the hierarchy.

7. The apparatus as claimed in claim 6, wherein:
the set determination function is arranged such that all addresses that are associated with a set within a plurality of sets in the adjacent snoop filter table are associated with the given set in the given backup snoop filter table.

8. The apparatus as claimed in claim 6, wherein, for at least one snoop filter table, the set determination function applies a hash function to selected bits within the specified address to identify the set that the specified address is associated with.

9. The apparatus as claimed in claim 8, wherein the set determination function is arranged, for at least one adjacent pair of snoop filter tables, to apply a first hash function when identifying a set in the first snoop filter table of the pair and a second hash function different to the first hash function when identifying a set in the second snoop filter table of the pair, whereby coherence data for a plurality of addresses that map to the same set in the first snoop filter table map to different sets in the second snoop filter table.

10. The apparatus as claimed in claim 1, wherein for at least one of the snoop filter tables the snoop control circuitry is arranged, when the coherence data stored in an identified entry within a given set of that snoop filter table is no longer required, to apply an eager promotion policy to determine whether an entry in an adjacent lower level snoop filter table stores coherence data whose associated address is associated with the given set, and in that event to move the coherence data from that entry in the adjacent lower level snoop filter table to the identified entry within the given set.

11. The apparatus as claimed in claim 1, wherein for at least one of the snoop filter tables the snoop control circuitry is arranged, when seeking to allocate new coherence data to an entry within a given set of that snoop filter table when all entries within that given set currently store valid coherence data, to apply a lazy promotion policy to identify whether, based on the addresses of the valid coherence data stored in the given set, there is an available recipient entry in an adjacent higher level snoop filter table to receive the valid coherence data from a source entry in the given set, and in that event to move the valid coherence data from the source entry in the given set to the available recipient entry in the adjacent higher level snoop filter table, and to then allocate the new coherence data to the source entry in the given set.

12. The apparatus as claimed in claim 11, wherein for at least one of the snoop filter tables the snoop control circuitry is arranged to apply an eager promotion policy, and for at least one other of the snoop filter tables the snoop control circuitry is arranged to apply the lazy promotion policy.

13. The apparatus as claimed in Claim 1, wherein:
in response to a received request whose identified address is a cacheable address within memory, the snoop control circuitry is arranged to perform a lookup operation in the snoop filter storage to determine whether an entry within the snoop filter storage stores coherence data for that identified address; and
the snoop control circuitry is arranged to adopt an access policy to determine how the individual snoop filter tables are accessed during the lookup operation.

14. The apparatus as claimed in claim 13, wherein the access policy causes each of the snoop filter tables to be accessed in parallel during the lookup operation.

15. The apparatus as claimed in claim 13, wherein, for at least one adjacent pair of snoop filter tables, the access policy causes a higher level snoop filter table in the pair to be accessed before a lower level snoop filter table in the pair.

16. The apparatus as claimed in claim 15, wherein the snoop control circuitry is arranged to apply an eager promotion policy in respect of the higher level snoop filter table in the pair, whereby when at least one entry in the set of the higher level snoop filter table associated with the identified address is an available entry for storing coherence data, the snoop control circuitry is arranged to determine that no lookup is required in at least the lower level snoop filter table in the pair.

17. The apparatus as claimed in claim 15, wherein the snoop control circuitry is arranged in a pipelined manner to enable lookup operations to be performed simultaneously for identified addresses of multiple received requests.

18. The apparatus as claimed in claim 15, wherein:
the snoop filter storage is arranged to maintain presence data to enable detection of a situation where the lower level snoop filter table does not store coherence data for the identified address, such that no lookup within the lower level snoop filter table is required.

19. The apparatus as claimed in claim 18, wherein the presence data takes the form of a presence bit for each set in the higher level snoop filter table, whose value indicates whether coherence data for an address that is associated with that set is allocated in an entry of a lower level snoop filter table.

20. The apparatus as claimed in claim 18, wherein:
the presence data takes the form of a vector of presence bits for each set in the lower level snoop filter table;
when coherence data for an address is allocated in an entry of a given set in the lower level snoop filter table, a chosen subset of bits of the address are used to set at least one presence bit in the vector provided for the given set; and
a chosen subset of bits of the identified address are used to identify at least one presence bit in the vector provided for the set in the lower level snoop filter table associated with the identified address, and the snoop control circuitry is arranged to determine that an access to the lower level snoop filter table is not required if any of the at least one identified presence bits is clear.

21. The apparatus as claimed in claim 20, wherein, for each address, one presence bit is identified in the vector provided for the set in the lower level snoop filter table associated with that address.

22. The apparatus as claimed in claim 20, wherein the vector of presence bits is organised as a Bloom filter and, for each address, two or more presence bits are identified in the vector provided for the set in the lower level snoop filter table associated with that address.

23. The apparatus as claimed in claim 20, wherein when seeking to move or evict coherence data from one of the entries of a given set in the lower level snoop filter table, the snoop control circuitry is arranged to preferentially select coherence data that would allow clearing of at least one presence bit in the associated vector.

24. The apparatus as claimed in claim 20, wherein when seeking to migrate coherence data from a source entry within a set in the higher level snoop filter table to a recipient entry in a given set in the lower level snoop filter table, the snoop control circuitry is arranged to preferentially select coherence data whose associated address is such that the selected coherence data can be allocated into the recipient entry without needing to set, within the vector associated with the given set, any presence bits that are currently clear.

25. The apparatus as claimed in claim 1, wherein at least one snoop filter table is arranged to have more ways than are provided in an adjacent snoop filter table at a higher level in the hierarchy.

26. A method of providing coherence data within an apparatus that implements a cache coherency protocol, comprising:
receiving at the apparatus requests from a plurality of processing units, where multiple of the plurality of processing units have associated cache storage;
employing a snoop unit to implement the cache coherency protocol when a request received by the apparatus identifies a cacheable address within memory;
providing a plurality of snoop filter tables organised in a hierarchical arrangement to form snoop filter storage, wherein the plurality of snoop filter tables comprise a primary snoop filter table at a highest level in the hierarchy, and each snoop filter table at a level in the hierarchy other than the highest level forms a backup snoop filter table for an adjacent snoop filter table at a higher level in the hierarchy;
arranging each snoop filter table as a multi-way set associative storage structure to provide a plurality of entries, and providing each backup snoop filter table with a different number of sets than are provided in the adjacent snoop filter table at the higher level in the hierarchy;
employing each entry in the snoop filter tables to store, for an associated address, coherence data used to determine which cache storages provided within the multiple processing units need to be subjected to a snoop operation in response to a request specifying that associated address; and
controlling allocation of coherence data into entries of the snoop filter tables by, when new coherence data is to be allocated into the snoop filter storage, applying an allocation policy to determine into which of the plurality of snoop filter tables the new coherence data is allocated.

* * * * *